United States Patent
Hagersten et al.

(10) Patent No.: US 10,671,543 B2
(45) Date of Patent: *Jun. 2, 2020

(54) SYSTEMS AND METHODS FOR REDUCING FIRST LEVEL CACHE ENERGY BY ELIMINATING CACHE ADDRESS TAGS

(71) Applicant: Samsung Electronics Co., Ltd., Suwon-si, Gyeonggi-do (KR)

(72) Inventors: Erik Hagersten, Uppsala (SE); Andreas Sembrant, Uppsala (SE); David Black-Schaffer, Uppsala (SE); Stefanos Kaxiras, Uppsala (SE)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/549,042

(22) Filed: Nov. 20, 2014

(65) Prior Publication Data

US 2015/0143046 A1 May 21, 2015

Related U.S. Application Data

(60) Provisional application No. 61/906,971, filed on Nov. 21, 2013.

(51) Int. Cl.
*G06F 12/1045* (2016.01)
*G06F 12/0864* (2016.01)
*G06F 12/0897* (2016.01)

(52) U.S. Cl.
CPC ...... *G06F 12/1054* (2013.01); *G06F 12/0864* (2013.01); *G06F 12/0897* (2013.01);
(Continued)

(58) Field of Classification Search
None
See application file for complete search history.

(56) References Cited

U.S. PATENT DOCUMENTS 4,727,482 A * 2/1988 Roshon-Larsen ............. G06F 12/1063
711/202
5,778,427 A * 7/1998 Hagersten ........... G06F 12/0864
711/128

(Continued)

FOREIGN PATENT DOCUMENTS

EP 2869208 A1 5/2015
EP 2869208 A1 5/2015

OTHER PUBLICATIONS

Wang et al. "Organization and performance of a two-level virtual-real cache heirarchy". Jun. 1989. ACM SIGARCH Computer Architecture News—Special Issue: Proceedings of the 16th annual international symposium on Computer Architecture. vol. 17, issue 3, p. 140-148. New York, NY, USA. (Year: 1989).*

(Continued)

*Primary Examiner* — Reginald G Bragdon
*Assistant Examiner* — James J. Thomas
(74) *Attorney, Agent, or Firm* — Harness, Dickey & Pierce, P.L.C.

(57) ABSTRACT

Methods and systems which, for example, reduce energy usage in cache memories are described. Cache location information regarding the location of cachelines which are stored in a tracked portion of a memory hierarchy is stored in a cache location table. Address tags are stored with corresponding location information in the cache location table to associate the address tag with the cacheline and its cache location information. When a cacheline is moved to a new location in the memory hierarchy, the cache location table is updated so that the cache location information indicates where the cacheline is located within the memory hierarchy.

15 Claims, 14 Drawing Sheets

(52) U.S. Cl.
CPC ...... *G06F 12/1063* (2013.01); *G06F 2212/65* (2013.01); *G06F 2212/655* (2013.01); *Y02D 10/13* (2018.01)

(56) References Cited

U.S. PATENT DOCUMENTS

| | | | | |
|---|---|---|---|---|
| 5,996,048 | A * | 11/1999 | Cherabuddi | G06F 12/0811 711/119 |
| 6,247,094 | B1 * | 6/2001 | Kumar | G06F 12/0862 711/118 |
| 6,467,027 | B1 * | 10/2002 | Kyker | G06F 9/3812 711/125 |
| 7,796,137 | B1 | 9/2010 | Mrazak et al. | |
| 8,631,206 | B1 * | 1/2014 | O'Bleness | G06F 12/0864 711/128 |
| 9,348,602 | B1 | 5/2016 | Alapati et al. | |
| 2003/0154345 | A1 | 8/2003 | Lyon | |
| 2004/0003182 | A1 * | 1/2004 | Cypher | G06F 12/0833 711/141 |
| 2006/0143384 | A1 | 6/2006 | Hughes et al. | |
| 2007/0022256 | A1 | 1/2007 | Cantin et al. | |
| 2008/0040555 | A1 | 2/2008 | Iyer et al. | |
| 2008/0162895 | A1 | 7/2008 | Luick | |
| 2009/0132766 | A1 | 5/2009 | Whalley et al. | |
| 2009/0144492 | A1 | 6/2009 | Barth et al. | |
| 2009/0182971 | A1 * | 7/2009 | Greiner | G06F 12/1009 711/206 |
| 2009/0222626 | A1 | 9/2009 | Ingle et al. | |
| 2010/0329256 | A1 * | 12/2010 | Akella | H04L 12/4625 370/392 |
| 2012/0137075 | A1 | 5/2012 | Vorbach | |
| 2013/0304991 | A1 | 11/2013 | Böttcher et al. | |
| 2014/0173379 | A1 | 6/2014 | Loh et al. | |
| 2014/0351518 | A1 * | 11/2014 | Chang | G06F 12/0811 711/122 |
| 2015/0143046 | A1 | 5/2015 | Hagersten et al. | |
| 2015/0234745 | A1 | 8/2015 | Roy et al. | |

OTHER PUBLICATIONS

International Search Report in corresponding International Application No. PCT/IB2014/066211 dated Mar. 23, 2015.
Written Opinion in corresponding International Application No. PCT/IB2014/066211 dated Mar. 23, 2015.
International Search Report in corresponding International Application No. PCT/IB2014/066212 dated Mar. 23, 2015.
Written Opinion in corresponding International Application No. PCT/IB2014/066212 dated Mar. 23, 2015.
Basu et al., "Reducing Memory Reference Energy with Opportunistic Virtual Caching", ISCA '12 Proceedings of the 39th Annual International Symposium on Computer Architecture, Jun. 9-13, 2012, Portland, Oregon.
Batson et al., "Reactive-Associative Caches", Proceedings of International Conference on Parallel Architecture and Compilation Techniques, Sep. 8-12, 2001, Barcelona, Spain.
Beckmann et al., "Managing Wire Delay in Large Chip-Multiprocessor Caches", MICRO 37 Proceedings of the 37th Annual IEEE/ACM International Symposium on Microarchitecture, Dec. 4-8, 2004, Portland, Oregon.
Binkert et al., "The gem5 Simulator", ACM SIGARCH Computer Architecture News, May 2011, vol. 39, No. 2.
Boettcher et al., "MALEC: A Multiple Access Low Energy Cache", Proceedings of Design, Automation, & Test in Europe Conference & Exhibition (Date), Mar. 18-22, 2013, Grenoble, France.
Calder et al., "Predictive Sequential Associative Cache", 2nd International Symposium on High Performance Computer Architecture, Feb. 1996, San Jose, California.
Chishti et al., "Distance Associativity for High-Performance Energy-Efficient Non-Uniform Cache Architectures", Proceedings of the 36th Annual International Symposium on Microarchitecture (MICRO-36 2003), Dec. 3-5, 2003, San Diego, California.

Hallnor et al., "A Fully Associative Software-Managed Cache Design", Proceedings of the 27th Annual International Symposium on Computer Architecture, Jun. 10-14, 2000, pp. 107-116.
Hardavellas et al., "Reactive NUCU: Near-Optimal Block Placement and Replication in Distributed Caches", Proceedings of the 36th Annual International Symposium on Computer Architecture, Jun. 2009, Austin, Texas.
Henning, "SPEC CPU2006 Benchmark Descriptions", SIGARCH Computer Architecture News, Sep. 2006, vol. 34, No. 4.
Intel Corportaion, "Intel Architecture Instruction Set Extensions Programming Reference", Feb. 2012, 319433-012A.
Kaxiras et al., "Computer Architecture Techniques for Power-Efficiency", Synthesis Lectures on Computer Architecture #4, Jun. 2008, Morgan and Claypool Publishers.
Kim et al., "An Adaptive, Non-Uniform Cache Structure for Wire-Delay Dominated On-Chip Caches", Proceedings of the 10th International Conference on Architectural Support for Programming Language and Operating Systems (ASPLOS), Oct. 5-9, 2009, San Jose, California.
Li et al., "McPAT: An Integrated Power, Area, and Timing Modeling Framework for Multicore and Manycore Architectures", MICRO'09, Dec. 12-16, 2009, New York, New York.
Luk et al., "Pin: Building Customized Program Analysis Tools with Dynamic Instrumentation", PLDI'05, Jun. 12-15, 2005, Chicago, Illinois, pp. 190-200.
Lynch, "The Interaction of Virtual Memory and Cache Memory", Technical Report CSL-TR-93-587, Oct. 1993.
Min et al., "Location Cache: A Low-Power L2 Cache System", ISLPED'04, Aug. 9-11, Newport Beach, California, pp. 120-125.
Muralimanohar et al., "CACTI 6.0: A Tool to Model Large Caches", International Symposium on Microarchitecture, Dec. 2007, Chicago, Illinois, HP Laboratories.
Powell et al., "Reducing Set-Associative Cache Energy via Way-Prediction and Selective Direct-Mapping", Proceedings of the 34th Annual International Symposium on Microarchitecture (MICRO), Dec. 2-5, 2001, Austin, Texas.
Qiu et al., "The Synonym Lookaside Buffer: A Solution to the Synonym Problem in Virtual Caches", IEEE Transactions on Computers, Dec. 2008, vol. 57, No. 12.
Qureshi et al. The V-Way Cache: Demand-Based Associativity via Global Replacement, Proceedings of the 32nd International Symposium on Computer Architecture (ISCA'05), Jun. 4-8, 2005.
Sanchez et al., "The ZCache: Decoupling Ways and Associativity", Proceedings of the 43rd Annual IEEE/ACM Symposium on Microarchitecture (MICRO-43), Dec. 4-8, 2010, Atlanta, Georgia.
Sembrant et al., "Efficient Software-based Online Phase Classification", 2011 IEEE International Symposium on Workload Characterization (IISWC), Nov. 6-8, 2011, Austin, Texas, pp. 104-115.
Sembrant et al., "TLC: A Tag-Less Cache for Reducing Dynamic First Level Cache Energy", MICRO-46, Dec. 7-11, 2013, Davis, California, Revised Version, Jan. 14, 2014.
Seznec, "A case for two-way skewed-associative caches", ISCA'93 Proceedings of the 20th Annual International Symposium on Computer Architecture, May 16-19, 1993, San Diego, California, pp. 169-178.
Seznec, "Don't use the page number, but a pointer to it", ISCA'96 Proceedings of the 23rd Annual International Symposium on Computer Architecture, May 22-24, 1996, Philadelphia, Pennsylvania, pp. 104-113.
Sherwood et al., "Automatically Characterizing Large Scale Program Behavior", Proceedings of the 10th International Conference on Architectural Support for Programming Languages and Operating Systems, Oct. 5-9, 2002, San Jose, California.
Sodani et al., "Race to Exascale: Opportunities and Challenges", 44th Annual IEEE/ACM International Symposium on Microarchitecture, 2011, Dec. 7, 2011, Keynote Speech.
"SPECjbb2005", Standard Performance Evaluation Corporation, http://www.spec.org/jbb2005/,downloaded Nov. 17, 2014.
"TPC-C V5", Transaction Processing Performance Council, http://www.tpc.org/tpcc/default.asp, downloaded Nov. 17, 2014.

(56) References Cited

OTHER PUBLICATIONS

Zebchuk et al., "A Framework for Coarse-Grain Optimizations in the On-Chip Memory Hierarchy", Proceedings of the 40th Annual IEEE/ACM International Symposium on Microarchitecture, Dec. 1-5, 2007, Chicago, Illinois.
Zhang et al., "Two Fast and High-Associativity Cache Schemes", IEEE Micro, Sep./Oct. 2007, pp. 40-49.
Bienia et al., "PARSEC vs. SPLASH-2: A Quantitative Comparison of Two Multithreaded Benchmark Suites on Chip-Multiprocessors," IEEE International Symposium on Workload Characerization, IISWC 2008, Sep. 14-16, 2008, Seattle, WA.
Cho et al., "Managing Distributed, Shared L2 Caches through OS-Level Page Allocation," 39th Annual IEEE/ACM Symposium on Microachitecture, MICRO-39, Dec. 9-13, 2006, Orlando, FL.
Cuesta et al., "Increasing the Effectiveness of Directory Caches by Deactivating Coherence for Private Memory Blocks," ISCA '11, Jun. 4-8, 2011, San Jose, CA.
Goodman, "Using Cache Memory to Reduce Processor-Memory Traffic," ISCA '83 Proceedings of the 10th Annual International Symposium on Computer Architecture, pp. 124-131, Jun. 13-17, 1983, Stockholm, SE.
Hagersten et al., "WildFire: A Scalable Path for SMPs," Proceedings of the Fifth International Symposium on High-Performance Computer Architecture, Jan. 9-12, 1999, Orlando, FL.
Hossain et al., "POPS: Coherence Protocol Optimization for both Private and Shared Data," 2011 International Conference on Parallel Architectures and Compilation Techniques (PACT), Oct. 10-14, 2011, Galveston Island, TX.
International Search Report dated Jan. 31, 2017 in related International Application No. PCT/IB2016/056655.
Kim et al., "Subspace Snooping: Filtering Snoops with Operating System Support," 19th International Conference on Parallel Architectures and Compilation Techniques (PACT), PACT '10, Sep. 11-15, 2010, Vienna, AT.
Laudon et al., "The SGI Origin: A ccNUMA Highly Scalable Server," ISCA '97 Proceedings of the 24th Annual International Symposium on Computer Architecture, pp. 241-251, Jun. 2-4, 1997, Denver, CO.
Office Action in related U.S. Appl. No. 14/549,065 dated May 24, 2016.
Office Action in related U.S. Appl. No. 14/549,065 dated Feb. 2, 2017.
Office Action in related U.S. Appl. No. 14/702,137 dated Jan. 13, 2017.
Office Action in related U.S. Appl. No. 14/702,153 dated Jan. 3, 2017.
Office Action in related U.S. Appl. No. 14/702,169 dated Nov. 18, 2016.
Office Action in related U.S. Appl. No. 14/702,183 dated Nov. 4, 2016.
Pugsley et al., "SWEL: Hardware Cache Coherence Protocols to Map Shared Data onto Shared Caches," Proceedings of the 19th International Conference on Parallel Architecture and Compilation Techniques, PACT '10, Sep. 11-15, 2010, Vienna, AT.
Sembrant et al., "The Direct-to-Direct (D2D) Cache: Navigating the Cache Hierarchy with a Single Lookup," ISCA 14 Proceedings of the 41st Annual International Symposium on Computer Architecture, Jun. 14-18, 2014, Minneapolis, MN.
Singhal et al., "Gigaplane™: A High Performance Bus for Large SMPs," Jul. 16, 1996.
Written Opinion dated Jan. 31, 2017 in related International Application No. PCT/IB2016/056655.
Woo et al., "The SPLASH-2 Programs: Characterization and Methodological Considerations," Proceedings of the 22nd Annual International Symposium on Computer Architecture, pp. 24-36, Jun. 1995.
Office Action in related U.S. Appl. No. 14/702,137, dated Nov. 2, 2017.
Office Action in related U.S. Appl. No. 14/702,169, dated Nov. 16, 2017.
Office Action in related U.S. Appl. No. 14/702,183, dated Aug. 23, 2017.
Office Action dated Apr. 4, 2017 in related U.S. Appl. No. 14/702,183.
Office Action dated Apr. 6, 2017 in related U.S. Appl. No. 14/702,169.
Office Action dated Jul. 13, 2017 in related U.S. Appl. No. 14/702,153.
Office Action dated Mar. 24, 2017 in related U.S. Appl. No. 14/702,137.
Office Action dated Apr. 20, 2018 in related U.S. Appl. No. 14/702,137.
Office Action dated Nov. 14, 2018 in related U.S. Appl. No. 14/702,137.
U.S. Notice of Allowance dated Apr. 25, 2019 issued in related U.S. Appl. No. 14/549,065.
Bienia et al., "PARSEC vs. Splash-2: A Quantitative Comparison of Two Multithreaded Benchmark Suites on Chip-Multiprocessors," IEEE International Symposium on Workload Characterization, IISWC 2008, Sep. 14-16, 2008, Seattle, WA.
Bienia et al., "The PARSEC Benchmark Suite: Characterization and Architectural Implications," Proceedings of the 17th International Conference on Parallel Architectures and Compilation Techniques, Pact '08, Oct. 25-29, 2008, Toronto, Ontario, CA.
Censier et al., "A New Solution to Coherence Problems in Multicache Systems," IEEE Transactions on Computers, Dec. 1978, vol. C-27, No. 12.
Charlesworth, "The Sun Fireplane System Interconnect," Proceedings of the 2001 ACM/IEEE Conference on Supercomputing, SC '01, Nov. 10-16, 2001, Denver, CO.

* cited by examiner

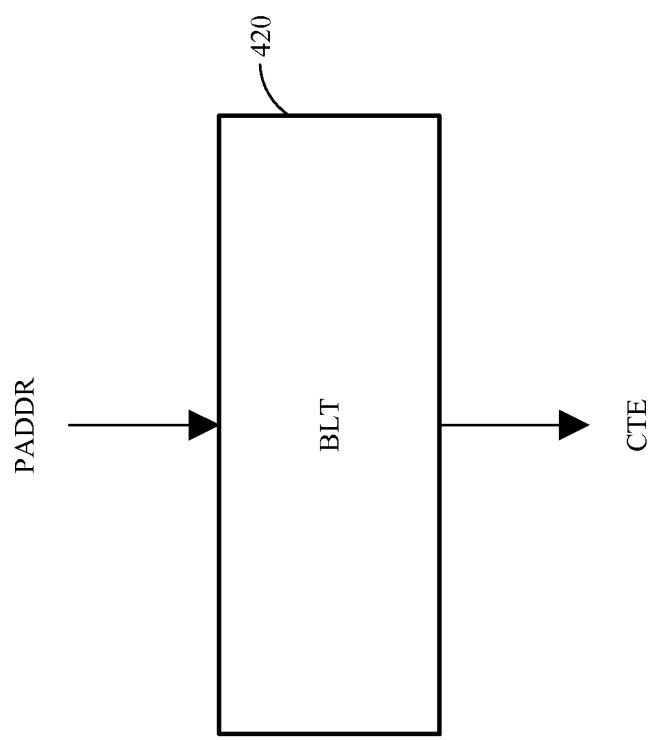

SYSTEMS AND METHODS FOR REDUCING FIRST LEVEL CACHE ENERGY BY ELIMINATING CACHE ADDRESS TAGS

RELATED APPLICATION

The present application is related to, and claims priority from U.S. Provisional Patent Application No. 61/906,971, filed Nov. 21, 2013, entitled "SYSTEM AND METHOD OF IDENTIFYING CACHE LOCATIONS IN A CACHE HIERARCHY," to Erik Hagersten et al., the disclosure of which is incorporated herein by reference.

TECHNICAL FIELD

Embodiments of the subject matter disclosed herein generally relate to methods and systems for accessing data in computer memory devices and, more particularly, to mechanisms and techniques for identifying cache locations in cache memory systems.

BACKGROUND

Today's processors are often equipped with caches that can store copies of the data and instructions stored in some high-capacity memory. A popular example today of such high-capacity memory is dynamic random access memory (DRAM). Herein, the term "memory" will be used to collectively refer to all existing and future memory implementations. Cache memories, or "caches" for short, are typically built from much smaller and much faster memory than other memory implementations and can subsequently only hold copies of a fraction of the data stored in main memories or secondary storage devices at any given time.

Often, the memory system of a computer system includes a hierarchy of caches, with larger and slower caches close to the main memory and smaller and faster caches closer to the processor, which configuration is typically referred to as a cache hierarchy or memory hierarchy. Each level in the cache hierarchy is referred to as a cache level. FIG. 1 depicts a computer system, where each CPU 101a, 101b, 101c is assigned its own first-level cache 102a, 102b, 102c (L1 cache). In this example, the second-level cache 103 is shared by all the CPUs 101a, 101b, 101c and will contain data and instructions that are accessed by all of the CPUs 101a, 101b, 101c. Memory 105 also stores instructions and data that are accessed by all CPUs 101a, 101b, 101c. The (main) memory 105 is typically accessed using a physical address, or PA for short, while the addresses generated by a CPU 101a, 101b, 101c are typically virtual addresses.

Such computer systems will also typically include one or more secondary storage devices in addition to main memory and cache memory. These secondary storage devices can include one or more of hard drives, optical drives, flash drives or the like, which are collectively represented here by disk 104. The disk or secondary storage 104 may store several orders of magnitude more data than the memory 105, but is not directly accessible using a physical address. If a CPU 101a, 101b, 101c wants to access data stored on the disk 104, a virtual memory system (not shown in FIG. 1) moves a chunk of data, typically referred to as a page, from the disk 104 to the memory 105 and creates a translation from virtual addresses corresponding to that page to physical addresses. A special kind of translation cache (not shown in FIG. 1), typically called a "translation look-aside buffer" or TLB for short, caches the translation mappings from virtual pages to physical pages. The virtual memory system can be viewed as a caching system, which stores a portion of the data located in the disk 104 in the memory 105.

FIG. 2 shows a more detailed view of the cache organization from FIG. 1, where the CPU 204 is shown to contain several cache-like structures, such as Instruction TLB (ITLB, 201), Data TLB (DTLB, 205) and a CPU core 202. The level 1 cache 102a, 102b, 102c is shown as including an instruction cache 200 and a data cache 206, interposed between the CPU 204 and the level 2 (and potentially higher level) caches 207. FIG. 2 also shows a high-capacity memory 208 connected to the cache hierarchy.

When a CPU 204 requests data that is present in the cache, referred to as a cache hit, that request can be serviced much faster than an access to data that is not present in the cache, referred to as a cache miss. Typically, an application running on the CPU 204 that experiences fewer cache misses will execute more quickly and consume less energy the same application which suffers from more cache misses, assuming that the two versions of the application otherwise have similar properties. Therefore, considerable effort has been invested in techniques for avoiding cache misses, and also to design implementations that can make cache hits and cache misses efficient with respect to both their access latency and the energy that these memory transactions consume In order to understand how to develop solutions to this cache hit/miss problem, some understanding of cache organization and terminology will be useful. Typically, data are installed into caches in fixed chunks that are larger than the word size of a processor, known as cachelines. Common cacheline sizes today are, for example, 32, 64 and 128 bytes, but as will be appreciated by those skilled in the art both larger and smaller cacheline sizes exist for various cache implementations. The cacheline size may also be variable for some cache implementations.

A common way to organize the data placement in memory 208 is in a manner that each data word is statically mapped to reside in one specific cacheline. Each cache typically has an index function that identifies a portion of the cache where each cacheline can reside, known as a set. The set may contain space to hold one or more cachelines at the same time. The number of cachelines which the set can hold is referred to as its associativity. Often, the associativity for all of the sets in a cache is the same. Such caches are often referred to as set-associative caches. The associativity may also vary between the sets. Each of the spaces in a set that can hold a cacheline is referred to as a way.

In order to determine the identity of each cacheline stored in each set, cachelines in a cache each have some identifier associated with them. One common example of such an identifier is an address tag. In this description, all such identifiers will be collectively referred to as address tags. When looking for a specific cacheline in a cache, its address may be used to determine the set of the cache where it may reside. The address tags of the cachelines of the corresponding set are compared to a tag portion of the address used to identify a cacheline to determine if the desired cacheline resides in the cache, and if so, in which way it resides, i.e., in which of the spaces in a set that can hold a cacheline it resides.

Often, each cache has built-in strategies to determine which cacheline to keep in the set and which cacheline to evict (known as eviction) to make space for a new cacheline being brought into the set, referred to as its replacement policy. Popular replacement policies used in conjunction with cache memories include, but are not limited to, least-recently used (LRU), pseudo-LRU and random replacement policies.

So-called inclusive cache hierarchies require that a copy of a block of data (for example a cacheline) present in one cache level, for example in the L1 cache, also exists in the higher cache levels (here, higher refers to cache levels with higher numbers than 1), for example in the L2 and L3 cache. Exclusive cache hierarchies only have one copy of the block of data (for example a cacheline) existing in the entire cache hierarchy, while non-inclusive hierarchies can have a mixture of both strategies. In exclusive and non-inclusive cache hierarchies, it is common that a cacheline gets installed in the next higher cache level upon eviction from a given cache level.

With this background on caches and cachelines in mind, this discussion now proceeds to illustrate one conventional technique for identifying specific cache locations within a cache hierarchy like that shown in FIGS. 1 and 2. FIG. 3 shows an example of the organization of a processing system containing a CPU 301, a DTLB 303, an L1 CACHE 307 and an L2 CACHE 311. The CPU 301 generates a memory request containing a virtual address 302 (VADDR), which is used to perform an associative lookup in the DTLB 303. The virtual address 302 is in this example divided into three parts: P-OFFSET (page offset, for example consisting of the low-level bits), TAG and INDEX. The INDEX portion of the virtual address 302 is used to identify the set within the DTLB 303 where the address translation may be stored.

The illustrated DTLB 303 used in this example has a two-way associative organization, showing two entries of the identified set. Each entry consists of an address tag (ATAG) 304, and physical page frame (PPF) 305. The TAG portion of the virtual address 302 is compared with the ATAGs 304 of each entry of the identified set. The logic 318 determines if there is match for any of the entries, and, if so, controls the MUX 306 to select the corresponding PPF 305. A physical address PADDR 316 is composed by concatenating the PPF 305 selected by MUX 306 with the P-OFFSET portion of the virtual address 302. Alternatively, if neither of the entries of the identified set match the TAG portion of the virtual address 302, then a TLB fill operation is performed and the needed translation entry is brought into the DTLB 303.

The PADDR 316 is used to perform a lookup in the L1 CACHE 307. More specifically, an INDEX portion of the PADDR 316 is used to identify the set where the cacheline containing the requested data may be stored. The depicted L1 CACHE 307 has a 2-way associative organization with two entries in the identified set. Each entry consists of an address tag (ATAG) 308, and data 309 of the corresponding cacheline. A TAG portion of the PADDR 316 is compared with the ATAGs of each entry of the identified set. The logic 319 determines if there is match for any of the entries, and controls the MUX 310 to select the corresponding data and returns the data via bus 315 to CPU 301. If neither of the entries matches (depicted by L1 MISS 317) a lookup in the L2 CACHE 311 is needed. While the division of PADDR 316 into INDEX and TAG portions for the L2 CACHE lookup may differ from the division done for the L1 CACHE lookup, the remaining steps for the L2 CACHE lookup are typically similar to those performed for the lookup in the L1 CACHE. Therefore, those remaining steps for the L2 CACHE lookup are designated with reference numerals 312, 313, 314, and 320, which refer to like elements with similar functions to those of 308, 309, 310, and 319 done for the L1 CACHE lookup, and thus their description will not be repeated here. If a miss in the L2 CACHE is determined, new lookups in higher-level caches or accesses to memory may be needed. It can be noted that if the INDEX portion of PADDR 316 used by the L1 cache is entirely composed by P_OFFSET bits, the access to the L1 cache 307 can be started before the PPF information coming from the MUX 306 is available. This is often referred to as a virtually indexed, physically tagged cache (VIPT).

To summarize the discussion associated with FIG. 3, it will thus be appreciated by those skilled in the art that contemporary implementations of a cache hierarchy may require many associative lookups to be performed in TLBs as well as at different cache levels before the location of a requested cacheline can be determined. Furthermore, each translation entry and cached cacheline needs to be accompanied by an address tag and a plurality of these tags needs to be compared with a portion of an address at each of these levels. Overall, this implementation comes at an enormous cost in terms of the dynamic energy used for each associative lookup. It also requires substantial overhead in static energy and memory capacity to store the extra tag information that is needed to perform the comparisons.

Accordingly, it would be desirable to provide systems and methods that avoid the afore-described problems and drawbacks associated with cache lookups for data.

SUMMARY

Methods and systems which, for example, reduce energy usage in cache memories are described.

According to an embodiment, a method of tracking the location of a cacheline in a memory hierarchy including one or more levels of cache memory includes the steps of storing cache location information about the cacheline in a cache location table, storing an address tag in the cache table to associate the address tag with the cacheline and its cache location information, and updating the cache location information when the cacheline is moved to a new location in the memory hierarchy, wherein the cache location information indicates where the cacheline is located within the memory hierarchy.

According to another embodiment, a data processing system including a memory hierarchy having one or more levels of cache memory includes one or more cache memory devices; a cache location table which stores cache location information about cachelines stored in at least one of the one or more cache memory devices, wherein the cache location table also stores an address tag for each cache location information to associate the address tag with a respective cacheline and a respective cache location information, and a mechanism for updating the cache location information when the cacheline is moved to a new location in the memory hierarchy, wherein the cache location information indicates where the cacheline is located within the memory hierarchy.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 4(b) depicts a translation facility between a physical address and a cache table entry according to an embodiment;

DETAILED DESCRIPTION

Figure 1:
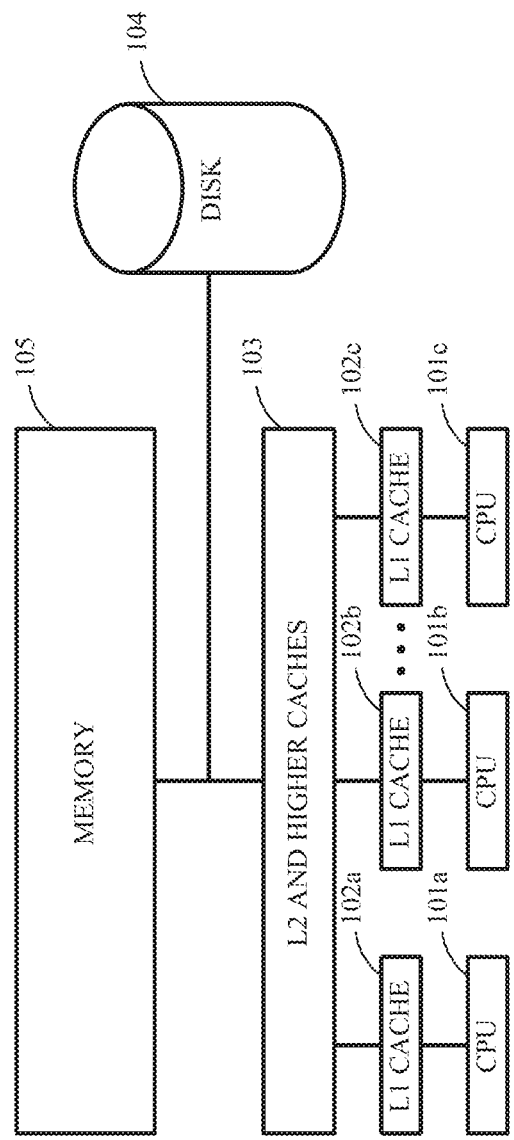
FIG. 1 is a block diagram of a multi-processor system.

The following description of the embodiments refers to the accompanying drawings. The same reference numbers in different drawings identify the same or similar elements. The following detailed description does not limit the invention. Instead, the scope of the invention is defined by the appended claims. Some of the following embodiments are discussed, for simplicity, with regard to the terminology and structure of particular cache hierarchies and methods for performing lookups in such hierarchies. However, the embodiments to be discussed next are not limited to these configurations, but may be extended to other arrangements as discussed later.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

In the following description numerous details provide a thorough understanding of the embodiments. These details include functional blocks and an exemplary cache location table CLB for implementing an efficient cache tagging scheme. In addition, while the cache tagging scheme of the embodiments is described with reference to specific caches and computer architectures, the embodiments are applicable to a wide range of memory and system architectures. In other instances, well-known circuits and structures are not described in detail so as not to obscure the embodiments unnecessarily.

According to various embodiments described herein, methods and systems provide for, among other things, cache handling schemes (CHS) which explicitly store location Information (LI). The LI is leveraged for efficiently accessing a multi-way cache of a computer system having a main memory and one or more processors. The CHS tracks the contents of the cache hierarchy, which may consist of several levels of associative caches, with a cache location buffer (CLB) or some hierarchy of CLBs. The caches include a plurality of cache lines divided into a number of segments corresponding to the number of ways In accordance with the embodiments, instead of discarding useful location information which is available every time a cache line is moved between the levels in the hierarchy, the location information is stored (e.g., updated) in the CLB and utilized for later cache access. The CLB is organized in an associative way. Accordingly, each CLB entry includes an address tag field and a plurality of LIs associated with the address tag field, although other techniques for storing the location information are possible according to other embodiments. Subsequently, the information stored in the CLB can be used to quickly access the location of the requested data without the need for additional associative lookups. More precisely, the right cache level, as well as the right location in the cache, can be determined without the need to access any address tags of the cache. Thus, using techniques in accordance with these embodiments, requested data can be found more quickly in the cache hierarchy, and in a manner which consumes less energy.

For a cache hierarchy consisting of set-associative cache with the same associativity, the number of bits in each LI is dependent on the number of ways and number of caches of the cache hierarchy covered by the CLB. One LI value can be reserved for an invalid pattern. In this implementation, the number of LI bit(s) is equal to the log base 2 of the number of way(s) plus the number of cache levels covered by the CLB plus one (i.e., log 2(way+levels+1)). If the number of ways of the different cache levels varies, or if caches other than set-associative caches are used, those skilled in the art will appreciate that other LI representations are possible.

Access of the cache via the CLB by the CHS can, for example, be generally performed as follows according to an embodiment. Upon receiving an address of a target cache line, the CLB attempts to match an address field of one of the cache location entries (CLE) which it has stored therein with a TAG portion of the address. If there is a match, an LI of the CLB entry is retrieved using a LI-offset portion of the address. The CHS indexes directly into a single cache line of the cache using the LI value, and an index part of an address. Thus, the cache does not need to store any address tag information.

Figure 2:
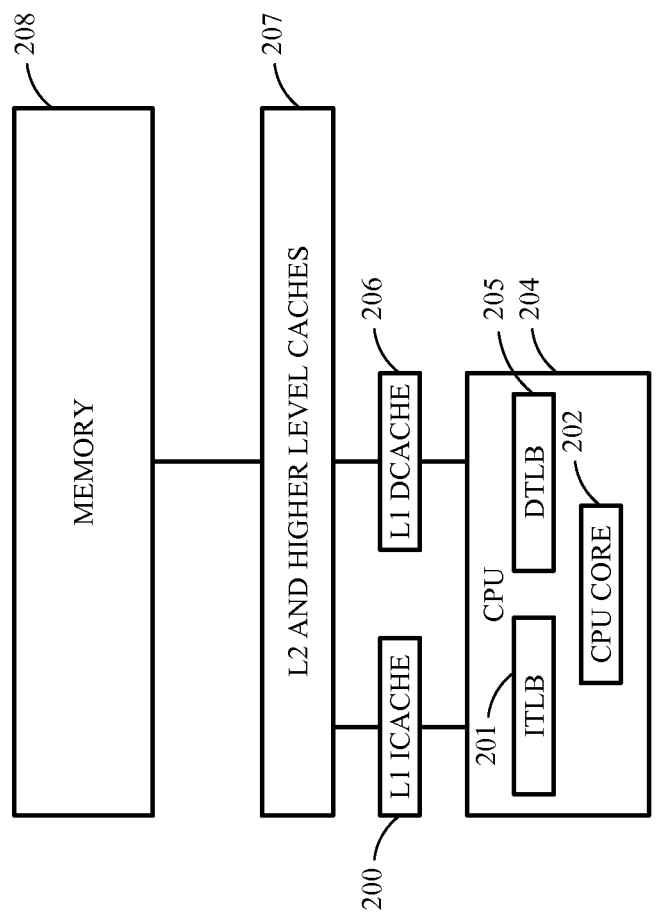
FIG. 2 is a block diagram of a uni-processor system cache hierarchy.

Thus, in accordance with the embodiments, systems such as those illustrated in FIG. 1 and FIG. 2, can also include a cache handling scheme (CHS) as described herein. That scheme includes a cache location buffer (CLB), or a hierarchy of CLBs, that keep track of the location of data units stored in a cache hierarchy. Whenever a data unit is moved in the cache hierarchy, its new location is recorded in the CLB.

The CLB according to such embodiments may be implemented as an associative organization, storing a plurality of cache location entries (CLE). Each CLE contains an address tag, used for the associative lookup, and some payload, for example a cache location table (CLT), storing a plurality of location information (LI). Other fields that may be included in the payload of a CLT include, but are not limited to, physical indices (PI), which store a partial or full address translation to physical addresses, statistics of access patterns to its associated cachelines, information about instructions accessing the data and pointers to various other hardware structures.

To illustrate these, and other features, of various embodiments, such embodiments will now be described with respect to FIGS. 4-12. For clarity, those skilled in the art will appreciate that these Figures illustrate logical implementations of the embodiments rather than actual physical implementations. Those skilled in the art will thus understand that these diagrams show logical representations of implementations and that physical implementations may differ substantially in their implementation details.

Figure 4A:
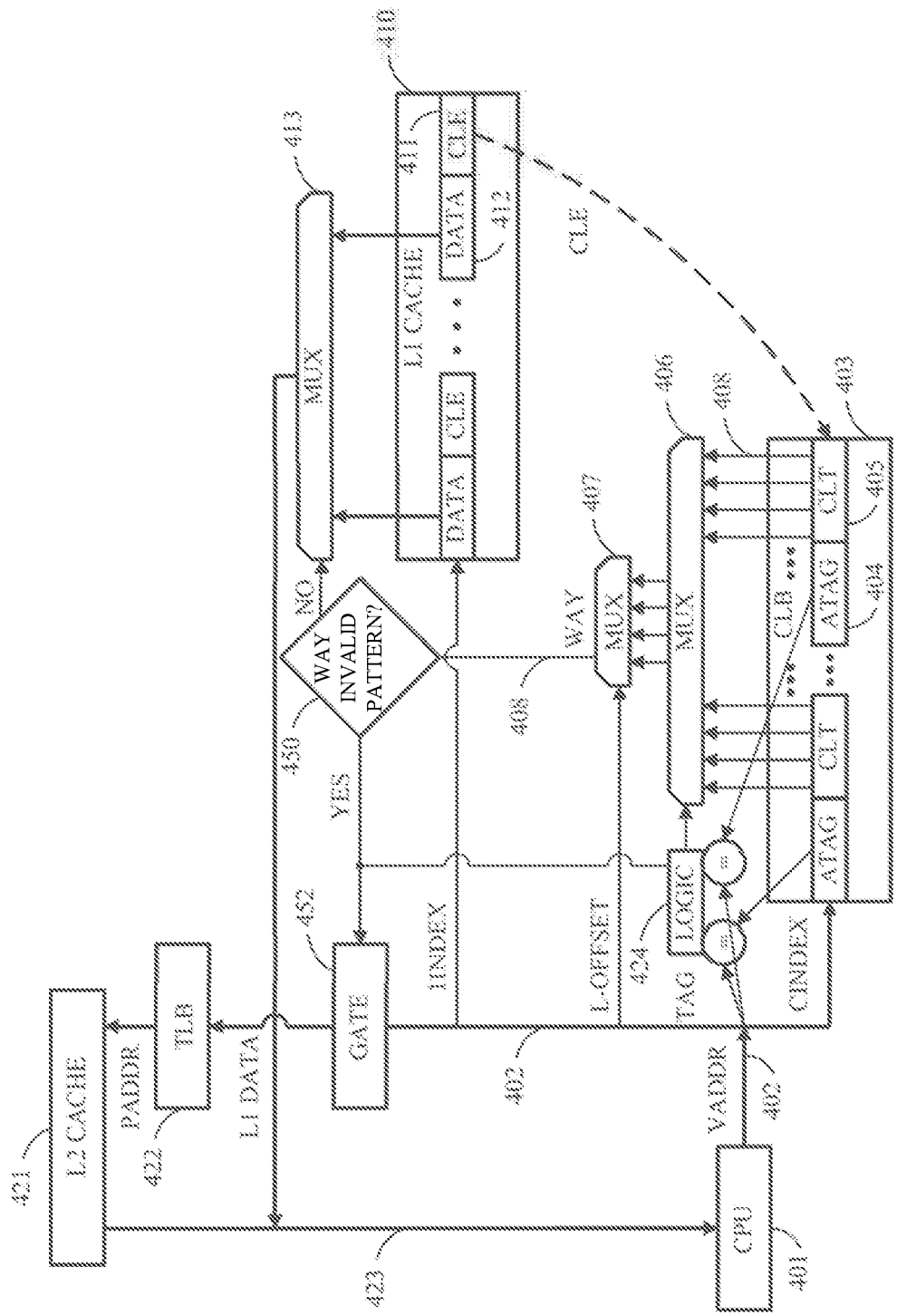
FIG. 4(a) is a block diagram illustrating an embodiment including a single-level cache hierarchy and a cache location buffer (CLB)

In one embodiment, the data units being tracked correspond to cachelines and the organization of a cache which stores those data units is set-associative. FIG. 4(a) illustrates such an embodiment, where a set-associative CLB 403 manages a first-level set-associative cache (L1 CACHE 410) of a memory hierarchy. A virtual address 402 is produced by a CPU 401 as a response to an access request to data residing in a cacheline. The virtual address 402 is divided into CINDEX, TAG and L-OFFSET portions, each portion including a plurality of address bits. The CINDEX portion is used to find the set of the CLB 403 where the location information about the cacheline requested by the CPU 401 resides. FIG. 4 illustrates a 2-way set-associative CLB 403 and the identified set contains two cache table entries (CTE), each with two components: an address tag (ATAG) 404, which stores an address tag, and cache location table (CLT) 405, which stores location information 408 for a plurality of cachelines. If there is a match between the TAG portion of the virtual address 402 and any of the ATAGs in the set identified by the CINDEX value, then the logic 424 will control MUX 406 to select the CLT corresponding to the matching ATAG. The L-OFFSET portion of the virtual address 402 will control MUX 407 to select the specific location information which corresponds to the cacheline requested by the CPU 401. In this example, the identified location information 408 consists of WAY information for the L1 CACHE 410. A 1 INDEX portion of the virtual address 402 is used to select the set where the requested cacheline resides in the L1 CACHE 410 and the WAY information is used to control MUX 413 to select that cacheline, which is returned via bus 423 to the CPU 401.

Figure 3:
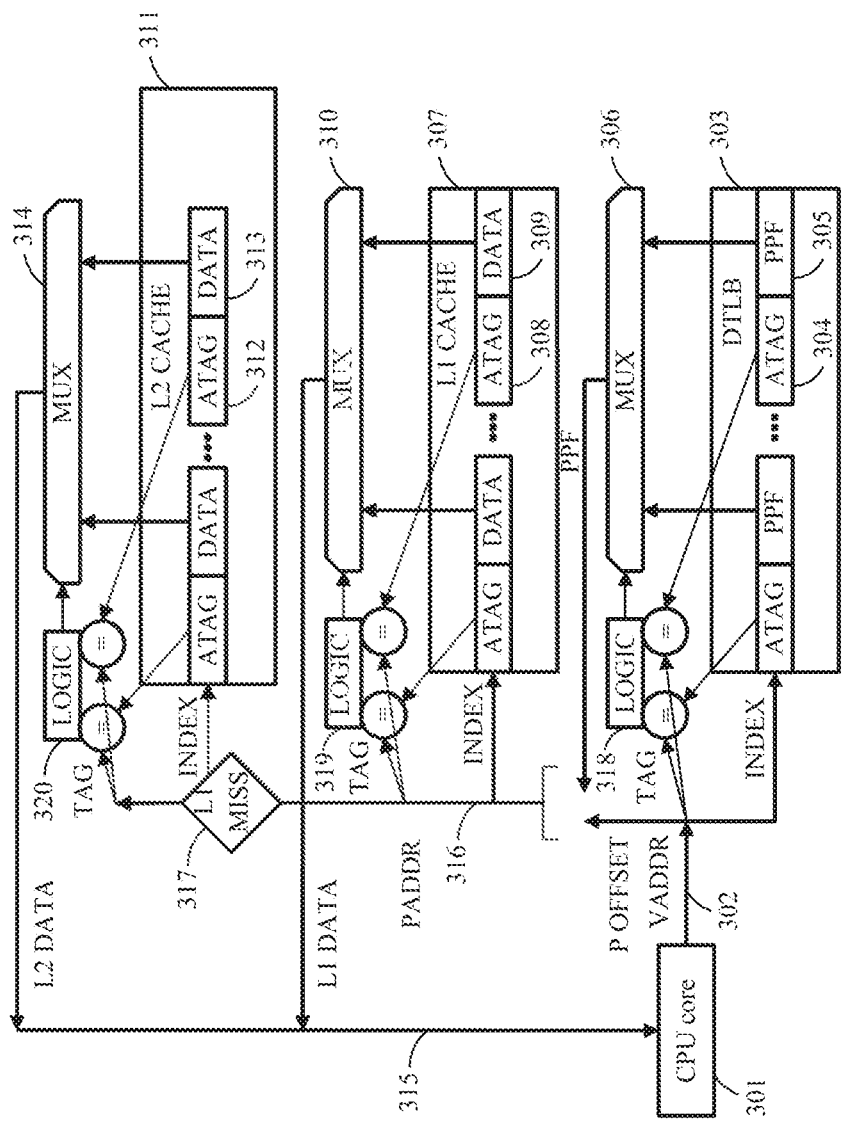
FIG. 3 illustrates a conventional implementation of a two-level cache hierarchy consisting of set-associative caches and a set-associative data translation look-aside buffer.

Note that, unlike the conventional caching system of FIG. 3, the L1 CACHE 410 of the embodiment of FIG. 4 does not store tags and does not perform comparisons between stored tags and a portion of an address to determine whether a cache hit or miss occurs, instead relying on the CLB 403 to assist in locating cached data that has been requested by a processor.

If the requested cacheline is indicated to not reside in L1 CACHE 410, or if none of the named ATAGs match the TAG portion of the virtual address 402, it can be determined that the requested cacheline does not reside in L1 CACHE 410 and no lookup in that cache is needed. Regarding the latter circumstance, a predetermined bit pattern for the location information, herein referred to as the invalid pattern, is defined to indicate that the requested cacheline does not reside in L1 CACHE 410 and is stored in the corresponding CLT when a cacheline is determined not to be stored in the L1 CACHE 410 so that subsequent accesses to the same cacheline may avoid a cache lookup in cache 410. Instead, when logic 424 or decision block 450 determine that the L1 CACHE 410 does not contain the requested data, then the gate function 452 is triggered to pass the virtual address 402 on as a request to the next level in the cache hierarchy (i.e., L2 CACHE 421, which in this example may be a conventional cache). In FIG. 4(a), L2 CACHE 421 is shown to be physically addressed, which is why a TLB 422 is used to translate the virtual address to a physical address before the L2 CACHE access is started.

In an embodiment, all valid cachelines in L1 CACHE 410 are required to have a corresponding LI in the CLB 403 that does not contain the invalid pattern. If none of the ATAGs in the CLB 403 set selected by the CINDEX match the TAG portion of the virtual address 402, it can be determined that CLB 403 does not contain LI for the requested cacheline. Then, one of the CTEs of the selected CLB set is chosen for eviction from the CLB 403 and the cachelines of its CLT 405 that do not already contain the invalid pattern are evicted from the L1 CACHE 410. Then, the ATAG 404 of the CTE which has just been evicted is set to match the TAG portion of the virtual address 402 and the location information of the CLT 405 of that CTE are all set to the invalid pattern. In one embodiment, CTEs with fewer CLTs which store non-invalid-patterns are prioritized to be chosen for eviction over CTEs which store more non-invalid-patterns. In an embodiment, the CTE chosen for eviction can be sent to storage and the cachelines associated with that CTE can be kept in the L1 CACHE 410.

In an embodiment, each of the cachelines 412 stored in the L1 CACHE 410 has a CLE pointer 411 associated with it. The CLE pointer 411 stores information to identify the CTE in CLB 403 that stores location information about the associated cacheline 412 in the CLB 403. In an embodiment, the CLE pointer 411 is used when a cacheline 412 is moved from the L1 CACHE 410 to identify the corresponding CTE, and a location offset is used to find the location information which corresponds to that cacheline 412 within the corresponding CTE. In this example, INDEX of the L1 cache 410 is identical to the L-OFFSET (location offset). After the correct location information is identified within the CLB 403, then that location information is updated to reflect the new location of the cacheline 412 which has moved. In one embodiment, the location information is changed to the invalid pattern when a cacheline is removed from the L1 CACHE 410.

In some embodiments, and referring now to FIG. 4(b), a backwards look-aside table (BLT) 420 can be provided, which is an associative structure that translates a physical address into the identity of the CTE, i.e., the ATAG 404 and CLT 405 combination in CLB 403, which stores the LI for a cacheline corresponding to that physical address. In one embodiment, the BLT 420 contains translations only for cachelines that have an LI entry in the CLB 403 (for clarity: this entry may contain the invalid pattern or some way information). If the BLT 420 does not contain an entry for a physical address, it can be determined that neither the CLB 403 nor the L1 CACHE 410 contains the requested cacheline or information associated therewith.

The BLT 420 can be used for a number of different purposes. For example, and in one embodiment, the BLT 420 can be used to find a cacheline to service external requests, such as requests from a coherence protocol. In another embodiment, a BLT lookup is used to detect a phenomenon known as the synonym problem. The synonym problem refers to a situation where a cache which is not physically tagged (such as the L1 CACHE 410 of FIG. 4(a)) may contain two copies of the same cacheline referred to by different virtual addresses. This can create consistency problems. Before a new CTE is brought into the CLB 403, performing a lookup in the BLT 420 using a physical address corresponding to the CTE will reveal if there already is a CTE in the CLB 403 covering that physical address, which would imply that a synonym may already reside in the L1 CACHE 410. In one embodiment, the CTE existing in the CLB 403 that is associated with the identified synonym, and all its corresponding cachelines, are evicted from the L1 CACHE 410 before the new CTE is put in the CLB 403.

Figure 5A:
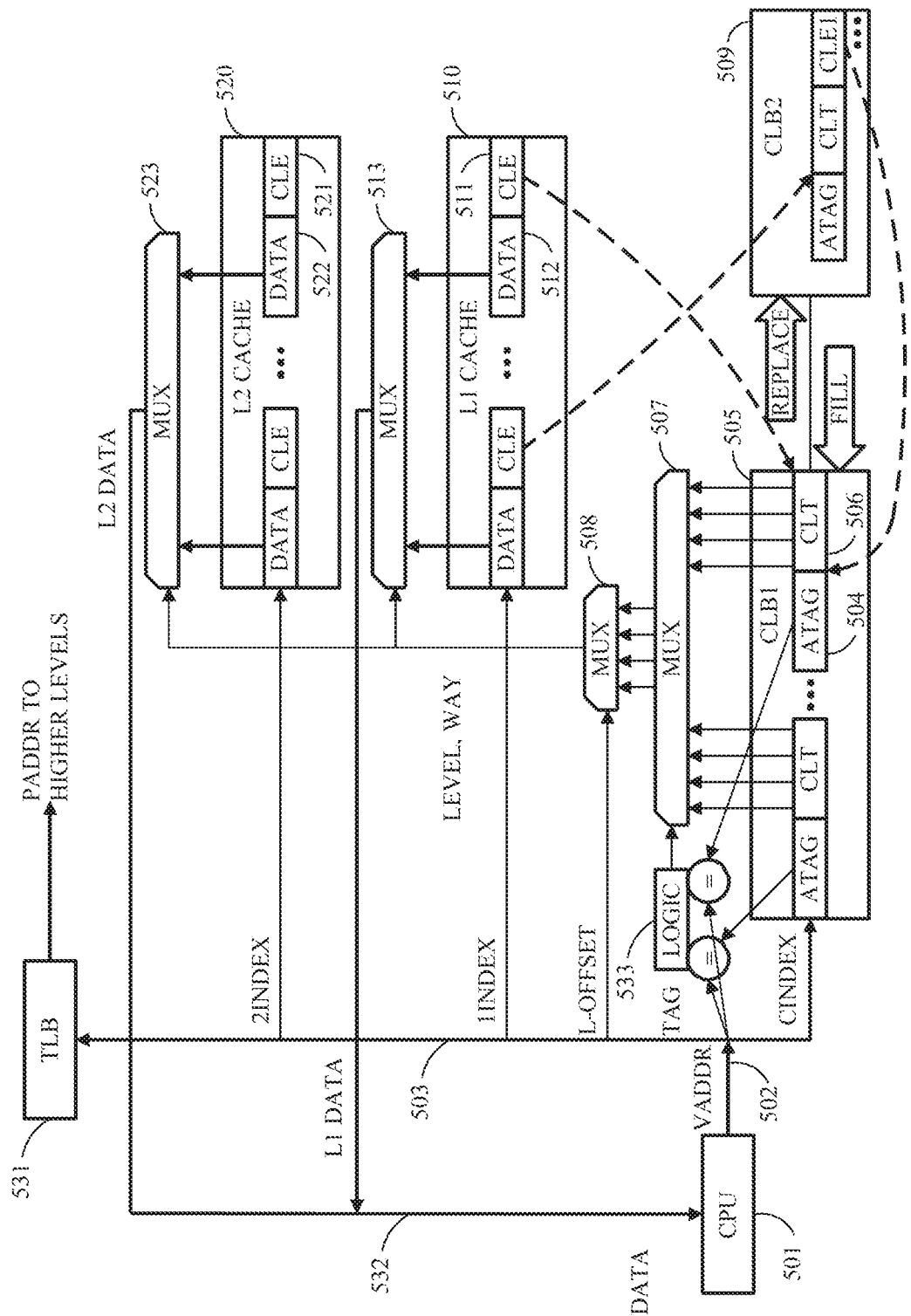
FIG. 5(a) is a block diagram illustrating an embodiment including a two-level cache hierarchy and a two-level CLB hierarchy.
Figure 5B:
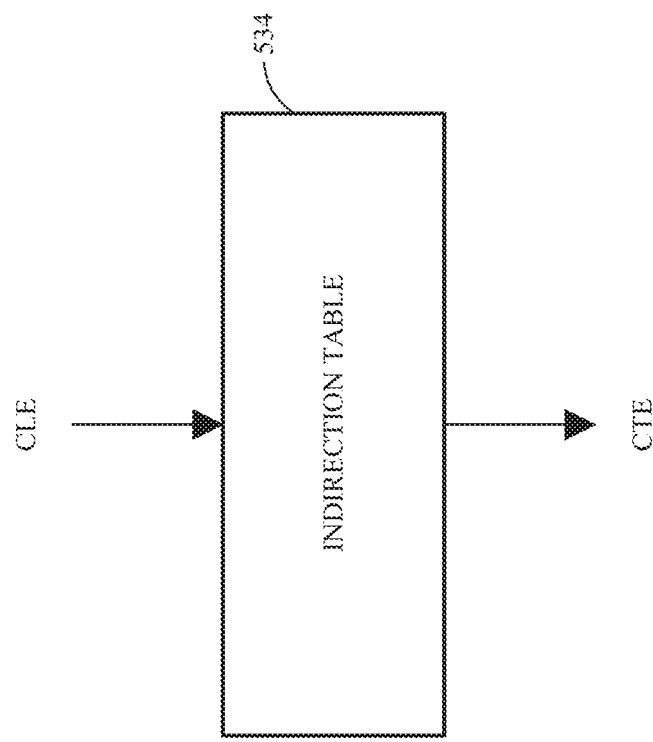
FIG. 5(b) illustrates a translation facility between a physical address and a cache table entry according to an embodiment.

Turning now to another embodiment, FIG. 5(*a*) shows a two-level virtual cache hierarchy with an L1 CACHE 510 and an L2 CACHE 520, both being set-associative caches. Requests for higher-level physically addressed caches (level 3 or higher), or to the main memory of the system, is sent to TLB 531, which performs the address calculation and sends the request to the higher levels together with the physical address.

The lookup in the CLB1 505 is performed in a similar way to the lookup in CLB 403 of FIG. 4(*a*). Thus, for example, CPU 501, upon receiving a request for a particular chunk of data, e.g., a cacheline, from an application being executed thereon, issues a virtual address request 502 for that cacheline. The virtual address 502 includes a number of portions or fids, three of which are used in this embodiment to check the CLB1 505 for location information associated with the requested cacheline. Specifically, the C INDEX portion of the virtual address 502 is used to select the corresponding set in the CLB 503, the TAG portion of the virtual address 502 is used to compare with ATAGs 504 in the identified set to identify a particular CLT 506 which includes the desired location information via logic 533 and MUX 507 and the L-OFFSET portion of the virtual address 502 is used to select a particular part of the CLT 506 which is associated with the requested cacheline via MUX 508.

However, in this FIG. 5(*a*) example, the location information for the requested cacheline selected by the MUX 507 and 508 contain information about a cache level where the requested data resides (in this example LEVEL information) as well as a physical location of the requested cacheline within that cache (in this example WAY information). If the requested cacheline does not reside in any of the two cache levels, the location information contains an invalid pattern.

In one embodiment, the cache level information output from MUX 508 is utilized to make the cache lookup selective, i.e., only performed in the cache of the identified level. For example, if the level information identifies Level 1 CACHE 510 as having the requested cacheline, a lookup is neither performed in the L2 CACHE 520, nor in any of the higher cache levels (including memory). Thus, in this example, a lookup would be performed in the L1 cache 510 by using the 1 Index portion of the virtual address 502 to select a set within the cache 510, and using the WAY information output from MUX 508 as a selection input to MUX 513 to select the DATA 512 associated with the requested cacheline for return to CPU 501 via bus 532. Alternatively, if the LEVEL information indicates that the requested cacheline is resident in L2 cache 520, then a similar lookup is performed in that cache using the 2Index portion of the virtual address and MUX 523 to output the appropriate DATA 522 as the requested cacheline to bus 532.

On the other hand, if the location information associated with the requested cacheline contains the invalid pattern, then it is determined that the requested cacheline neither resides in L1 cache 510 nor in L2 CACHE 520 and subsequently cache lookup may not be performed in either of them. Instead, a request to the higher levels is sent off immediately via TLB 531.

FIG. 5(*a*) also depicts an embodiment where a CTE which is replaced (evicted) from the CLB1 505 can be stored in CLB2 509. When a new request later is made for that particular CTE, it could be re-instantiated (filled) from the CLB2 509 into the CLB1 505. In this embodiment, the CLE pointers 511 and 521 are updated to track the current CTE's location and may point to a location in CLB1 505 or CLB2 509. When data is moved in the cache hierarchy, its corresponding location information in its corresponding CTE is updated. The CLE pointer 511 and CLE1 pointer in CLB2 point to the CTE in CLB1 505 that contains the active location information which corresponds to data stored in the L1 cache 510.

In one embodiment, the system of FIG. 5(*a*) can also include a new indirection table 534 shown in FIG. 5(*b*) to track the association between a cached cacheline and its associated CTE. When a CTE is moved, only the associated entry in the indirection table needs to be moved. This indirection table can, for example, be leveraged when a CTE is moved between CLB levels (for example between CLB1 505 and CLB level 509 of FIG. 5) or when a synonym has been detected.

Figure 6:
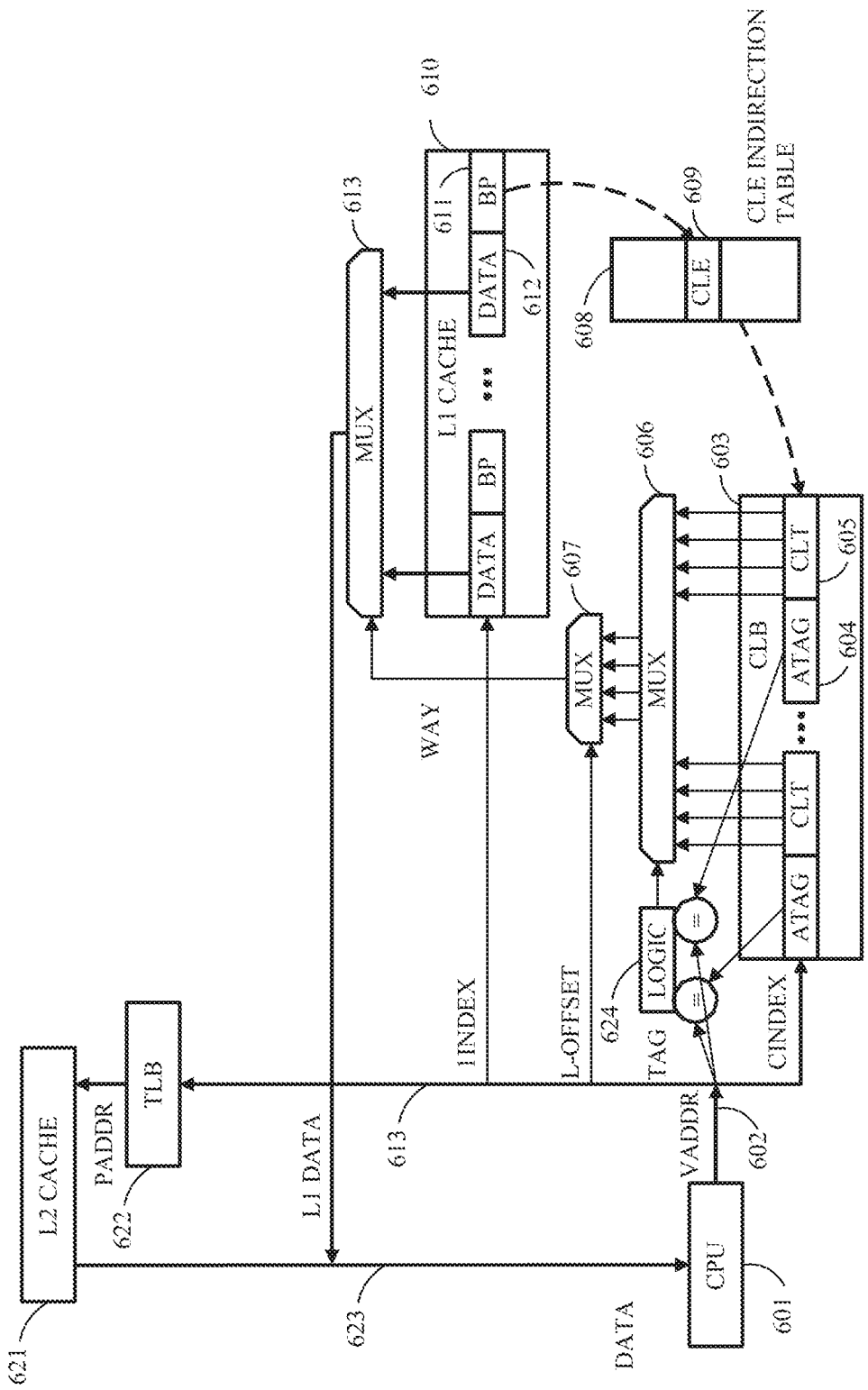
FIG. 6 is a block diagram illustrating an embodiment including a single-level cache hierarchy, a CLB and one extra indirection table for associating cache lines with cache table entries (CTEs)

FIG. 6 shows an embodiment similar to FIG. 4(*a*), but extended with an extra CLE indirection table 608. Therein, like reference numerals refer to like elements with similar functions to those found in FIG. 4(*a*) and described above (e.g., MUX 606 performs the same function as MUX 406) and thus their description will not be repeated here, except for elements whose function differ as follows. For example, the CLE pointer 411 of FIG. 4(*a*) has been replaced by a backwards pointer (BP) 611, pointing to one entry of the CLE indirection table 608. Each entry in CLE indirection table 608 stores a pointer to a CTE. For example, the cacheline 612 has an associated BP 611 pointing to the CTE entry 609 of CLE indirection table 608. The CLE entry 609 is pointing to the CTE, consisting of ATAG 604 and CLT 605, that is associated with cacheline 612.

In one embodiment, the existence of a CLE indirection table 608 is leveraged to make the handling of synonyms more effective. Once a BLT lookup has detected that a new CTE that is about to be installed in the CLB 603 has a synonym entry already installed in the CLB 603, the CLE pointer 609 of the CLE indirection table pointing to the synonym is changed to instead point to the new CTE, and the contents of the CLT of the synonym is copied to the CLT of the new CTE and, finally, the synonym CTE is removed. In this embodiment, no cachelines of the L1 CACHE 610 need to be evicted nor will any of their backwards pointers BP 611 need to be changed.

In one embodiment with more than one CLB level and a CLE indirection table, a movement of a CTE from one CLB level to another CLB level (for example an eviction of a CTE from CLB1 to CLB2) only implies that the corresponding entry of CLE INDIRECTION TABLE pointing to the old CLE location need needs to be changed to point to the new CTE location and that none of the backwards pointers BP (or CLT pointers for a multi-level cache system) in the cache, or caches, need to be changed.

The number of cachelines whose location information resides in a single CLT may in some implementations correspond to the number of cachelines of a page of the architecture. For example, in an architecture with 4 kbyte pages and 64 byte cachelines, the CLT may contain 64 location information (LI) entries covering the 64 cachelines of a page. In another implementation, a CLT may contain fewer LI entries than the number of cachelines of a page. For example, the CLT may contain only 16 LIs covering only one quarter of a page in the above example. This is referred to as a micropage. This implies that four different CLB micropage entries are needed to cover all the cachelines of a page. Virtual address bits can be used to determine which of these four micropages a specific cacheline belongs to. The number of location information (LI) entries contained in an CLT may be different for different CLB levels.

In one embodiment a plurality of banks, each containing one CLB and one or more levels of caches, is formed. The CTEs and the cachelines are divided between the banks in such a way that CTEs associated with each cacheline resides in the same bank as the cacheline and that a portion of the address used to access a cacheline can determine in which bank that cacheline resides. In one implementation there are four such banks and the CLT of each CLB contains location information for one quarter of the cachelines of a page for that architecture. In one embodiment, micropages are stored in the CLB which facilitates the co-location of cachelines and their corresponding CLE in the same bank.

Figure 7:
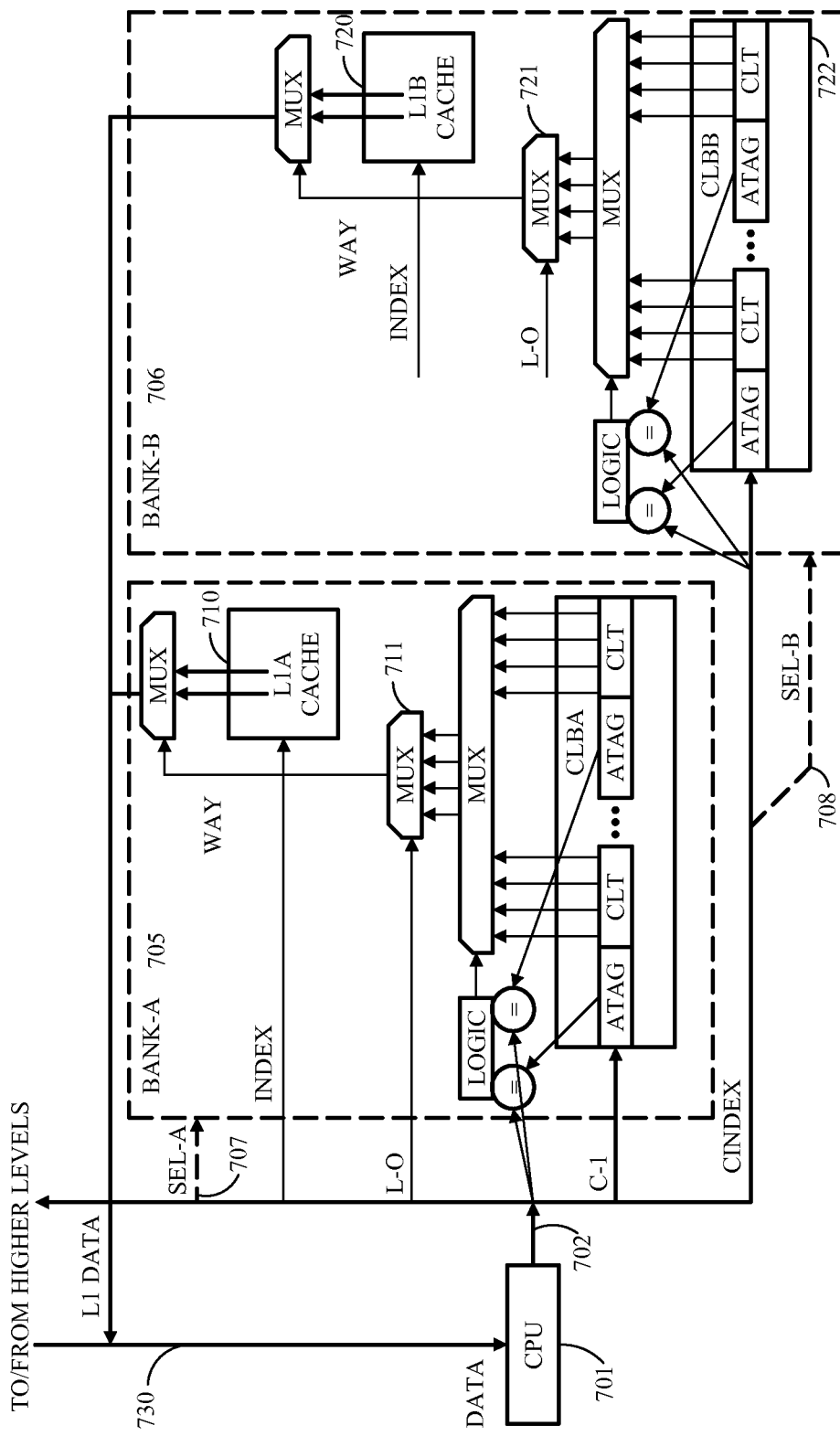
FIG. 7 is a block diagram illustrating an embodiment including a single-level cache hierarchy and a CLB, where the cache and CLB implementation is banked.

FIG. 7 shows an example of such a banked embodiment. Therein, like reference numerals refer to like elements with similar functions to those found in FIG. 4(*a*) and described above (e.g., arrow 702 refers to a virtual address much like reference 402 in FIG. 4(*a*)) and thus their description will not be repeated here, except for elements whose function differ as follows. Additionally, some common elements (e.g., MUXs and logic elements) are not referred to by specific reference number in FIG. 7 as they have been repeatedly discussed in the earlier embodiments. However, BANK-A 705 contains L1A CACHE 710, CLBA 712 and elements functionality associated with those storage devices, such as MUX 711. BANK-B 706 contains L1 B CACHE 720, CLBB 722 and functionality associated with those storage devices, such as MUX 721. CLBA 712 and CLBB 722 have their CLT entries organized in micropages. A portion of the address bits from virtual address 702 is used to form a selection signal SEL-A 707, selecting BANK-A, and a portion of the address bits 702 is used to form a selection signal SEL-B 708, selecting BANK-B.

In one embodiment, only a selected bank will perform a cache lookup in its caches. In one embodiment, some of the signals sent to a bank, such as INDEX signals and other portions of the address 702, are not sent to a bank unless it is selected. In one embodiment, a plurality of banks can be accessed in parallel using separate CPU ports. This allows a plurality of memory accesses, which have been determined to be to different banks, to be performed in parallel.

Figure 8:
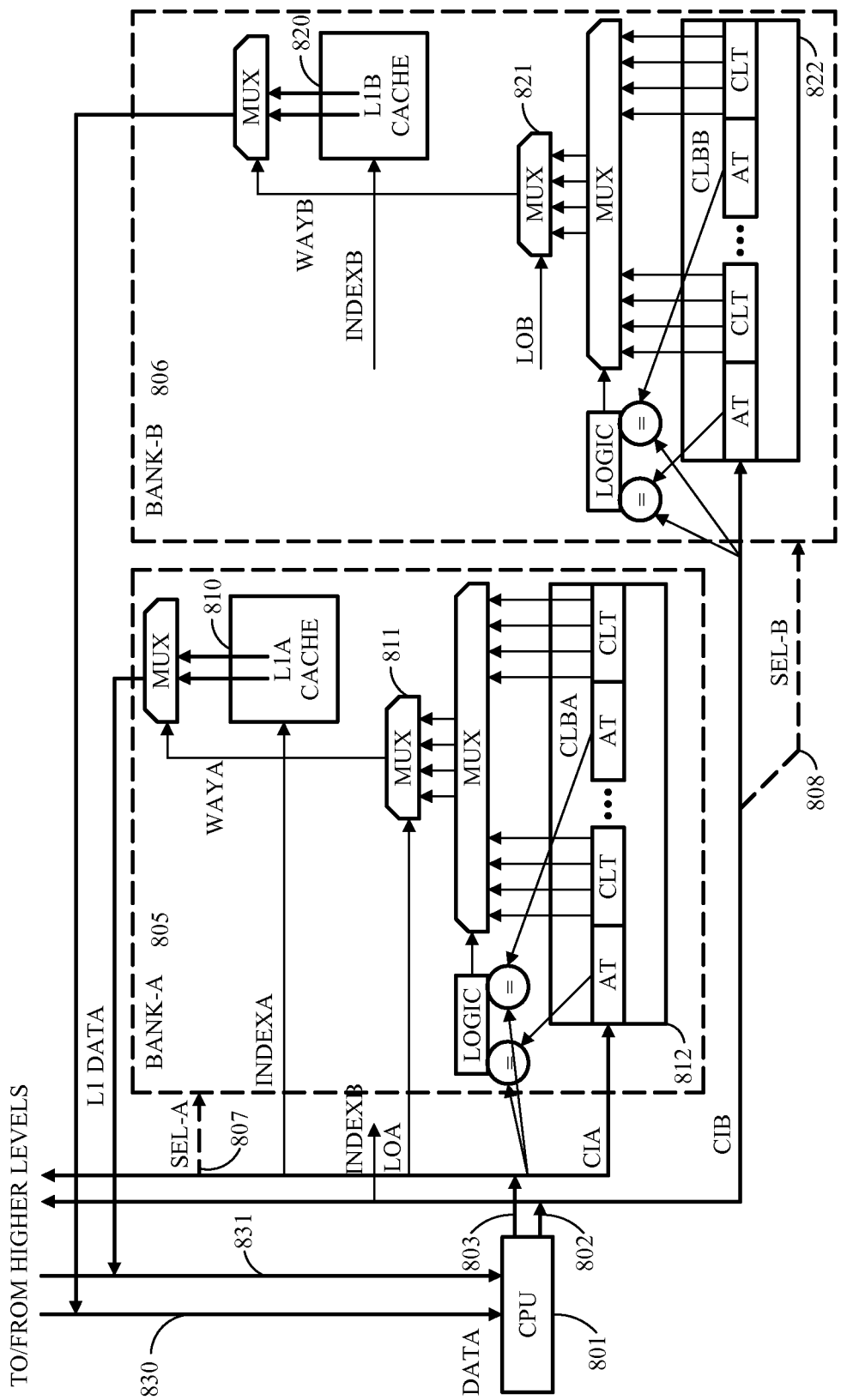
FIG. 8 is a block diagram illustrating an embodiment including a single-level cache hierarchy and a CLB, where the cache and CLB implementation is banked to allow for multi-ported access.

For example, FIG. 8 shows an embodiment with two banks, BANK-A 805 and BANK-B 806 connected to their own separate CPU ports 803 and 802, respectively. Some common elements with respect to previous embodiments (e.g., MUXs and logic elements) are not referred to by specific reference number in FIG. 8 as they have been repeatedly discussed in the earlier embodiments. Each CPU port 802 and 803 thus issue their own request for data as different virtual addresses. Each of these virtual addresses are parsed into their respective fields (CIndexData (with bank selection indicator), TAG field, L-Offset, and INDEX) for processing as described above to access the requested cachelines. For example, CLBA 812 will operate, based at least in part on reception of a valid selection signal 807 into BANK A, to output various location information to the MUX connected thereto, from which location information associated with the requested cacheline will be further selected by MUX 811 for retrieval from L1A cache 810 in the manner previously described. The BANK-B operation will be similar using CLBB 822, MUX 821 and L1B cache 820. The data associated with these requested cachelines from the two BANKs are returned on two separate data ports, 831 and 830, respectively.

In one embodiment, caches of different levels covered by one or many CLB levels may be accessed using different address types. For example, one level may be accessed using virtual addresses and another level may be accessed using physical addresses.

Figure 9:
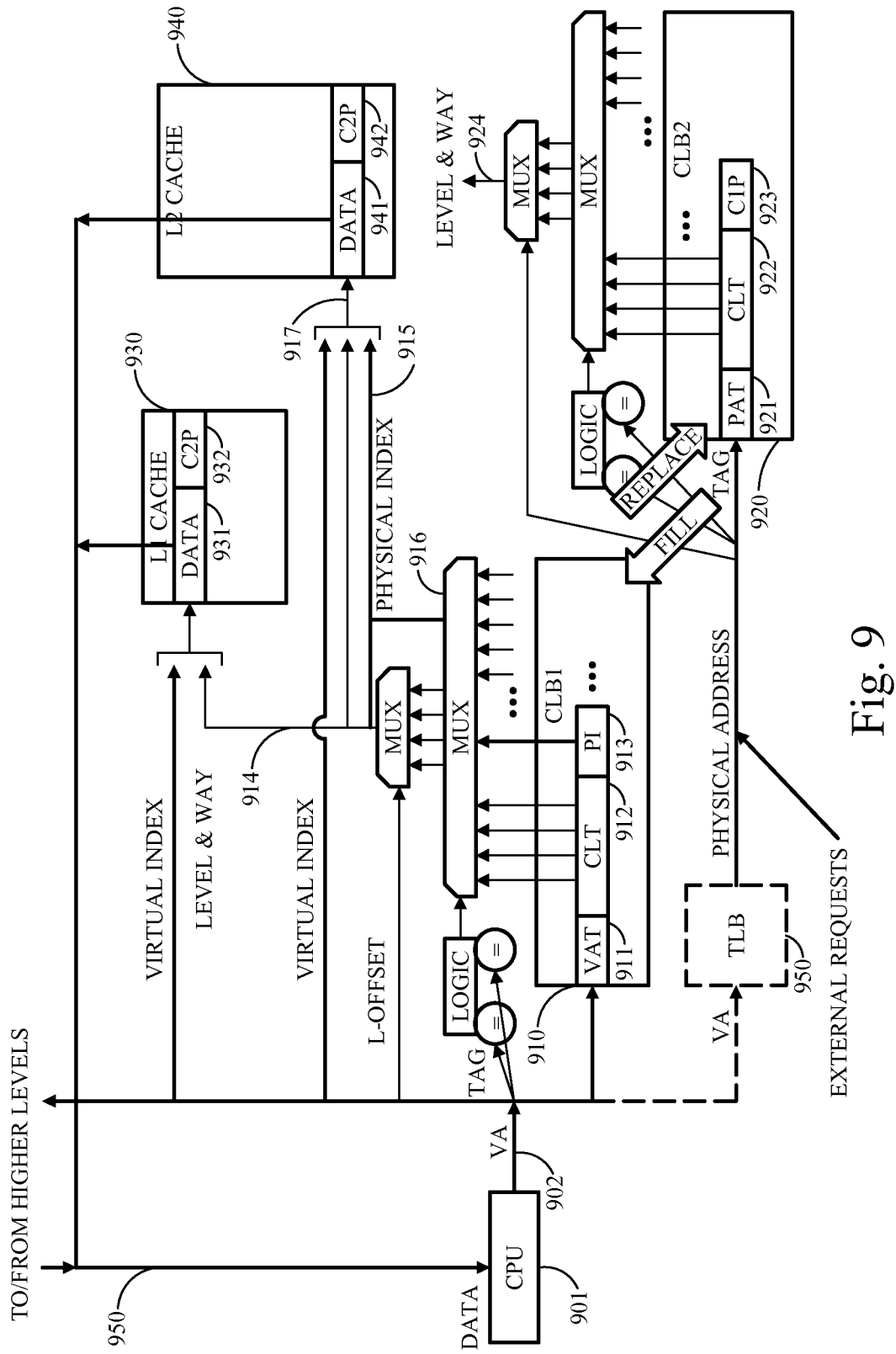
FIG. 9 is a block diagram illustrating an embodiment including a two-level cache hierarchy and a two-level CLB hierarchy, where the first level is virtually accessed and the second level is physically accessed.

To illustrate the usage of different address types, FIG. 9 shows a two-level cache hierarchy of set-associative caches, where CPU 901 generates virtual addresses (VA) 902, L1 cache 930 is accessed using virtual addresses and L2 cache 940 is accessed using physical addresses according to an embodiment. FIG. 9 also shows a two-level CLB hierarchy of set-associative CLBs, where CLB1 910 is accessed using virtual addresses and CLB2 920 is accessed using physical addresses. Each CTE in CLB1 consists of a virtual address tag (VAT) 911, a CLT 912 and a physical index (PI) 913. MUX 916 selects the CLT as well as the PI 915 of the matching CTE. An index 917 for L2 CACHE 940 is formed using the selected PI 915, a VIRTUAL INDEX portion of the virtual address 902 and a portion of the location information 914 associated with the accessed cacheline. In the example of a set-associative L2 CACHE 940, that portion corresponds to the WAY information. An index for L1 CACHE 930 is formed using the VIRTUAL INDEX portion of the virtual address 902 in combination with the selected location information.

For clarity, it should be noted that FIG. 9 shows an alternative representation of the selection functionality of the MUXes placed above the L1 CACHE and L2 CACHE of FIGS. 4-8. More specifically, in FIG. 9, the selection functionality is implemented by including the WAY information in the index selecting the information to read out from the respective cache. A similar solution would be applicable to all of the previous embodiments.

FIG. 9 shows each entry in the L1 cache 930 and L2 cache 940 to have a CLB2 POINTER (C2P), 932 and 942 respectively, associated with its cacheline. (DATA), 931 and 941 respectively. The C2P pointers point to respective associated CTE in CLB2 920. Each CTE in CLB2 920 contains a physical address tag (PAT) 921, a CLT 922 and a CLB1 Pointer (C1P) 923. If the CLB2 entry has a corresponding CLT residing the CLB1 910, its C1P will point to that entry.

In one embodiment when no matching CTE can be found in CLB1 910, a corresponding CTE is looked for in CLB2 920. FIG. 9 shows how the virtual address 902 generated by CPU 901 is translated to a physical address through a lookup in a TLB 950. The physical address is used to generate Index, Tag and Location portions used in the CLB2 920 lookup. If a corresponding entry exists in CLB2 920, the CLT 922 of that entry is copied to a new CLT entry in CLB1 910 with its VAT and PI portions set to appropriate portions of the virtual and physical addresses, respectively. The corresponding entry in CLB2 920 has its CLB1 Pointer (C1P) 923 set to point to the new entry in CLB1.

In one embodiment, if no corresponding entry in CLB2 920 is found, a new CLB1 entry is formed with all entries in its CLT set to the invalid pattern and its VAT and PI portions set to appropriate portions of the virtual and physical Addresses respectively. Similarly, a new entry is formed in CLB2 920 with its C1P 923 pointing to the new CLT entry formed in CLB1 910.

In one embodiment, if the lookup in CLB2 920 caused by a lookup miss in CLB1 finds an entry in CLB2 with a valid C1P value, the CLB1 entry pointed to by the C1P is determined to be a synonym for the CLB1 entry needed. A new CLB1 entry is created, the CLT from the synonym CLB1 entry is copied to its CLT and its VAT and PI portions set to appropriate portions of the virtual and physical addresses respectively, and the C1P portion of the corresponding CLB2 entry is set to point to the new CLB1 entry. The synonym CLB1 entry will not be used anymore and can now be reused. That way, only one synonym is allowed to exist in the CLB1 at any given point in time.

In one embodiment, the location information corresponding to a requested cacheline of a matching CTE can indicate in which level the requested cacheline resides. This will cause embodiments to perform a direct cache lookup at the appropriate level without the need to perform any other lookups. For example, in the system shown in FIG. 9, the location information can distinguish between level one (L1 CACHE), level 2 (L2 CACHE) and HIGHER LEVELS (any cache of level 3 or higher, or the memory). A cacheline in HIGHER LEVELS has its location information set to the invalid pattern.

In one embodiment, the contents of the CLBs of a multi-level CLB implementation are kept consistent with the location of the cachelines of the multi-level cache system they manage. A cacheline that is moved in the cache hierarchy, including but not limited to requests for it from the CPU, evictions, prefetching activities and coherence activities, cause an update to its corresponding location information in one or many of the CLBs. For example, in FIG. 9, updating a cacheline's corresponding location information can involve the steps of following its associated C2P pointer to find its corresponding CTE in the CLB2 920 and updating its corresponding location information. And, if the C1P pointer of the corresponding CLB2's CLE is valid, following the C1P to find its corresponding CTE in the CLB1 910 and updating its location information associated with the cacheline. In one embodiment, the entry in the CLB2 is not updated if there is a valid C1P pointer.

In one embodiment, requests from other subsystems, such as requests related to a coherence protocols, can perform a CLB2 lookup to determine if a cacheline associated with the request may reside in the either of the cache levels of the cache hierarchy it covers. If there is no entry in the CLB2 920 which is associated with the address of the external request, it can be determined that the requested cacheline does not reside in the either of the cache levels covered by the CLB2 920.

From these examples it can be appreciated that some of the features provided by the BLT according to previous descriptions can instead be provided by a physically tagged CLB2 containing a C1P pointer associated with each CLT entry. Likewise, some of the features previously solved by the CLE indirection table can also be solved by a CLB2 containing C1P pointers.

As will be appreciated from the foregoing, using tag-less cache systems according to these embodiments will result in a number of different types of transactions which will occur when various cachelines located in different storage devices are requested by a CPU 901. It will be appreciated by those skilled in the art that the choice of coherence protocol to be used in a data processing system is orthogonal to the techniques for locating cachelines described in these embodiments. The coherence protocol used in these embodiments may be a so-called snooping broadcast protocol or a directory-based protocol. While a broadcast protocol often sends its external coherence requests to all its cache sub-systems caches, a directory-based coherence is more selective and keeps track of which sub-system caches may have cached copies and only sends its coherence request to those sub-systems. A directory-based coherence protocol has a directory to its help to track which cache sub-systems may have a cached copy of each cache line. So, while the directory keeps track of cache sub-systems with cached copies of a cacheline, the location information described in these embodiments instead track the cache location information that, for example, can identify the cache level and way. The coherence protocol can leverage this cache location information to find the location of a requested cache line within a targeted cache sub-system. Unlike the directory information stored by a directory based coherence protocol, however, the cache location information provided in these embodiments will also help a CPU access to find the location of a requested cacheline.

For example, the system depicted in FIG. 9 may be a cache subsystem in a larger system comprised of several such cache sub systems implementing either snooping or directory-based coherence. If such a sub-system implements directory-based coherence, then it will also include a directory table (not shown in FIG. 9) in addition to the CLBs 910 and 920. In such a system, each cacheline in the L2 cache and the L1 cache will have some state information associated with them (also not shown in FIG. 9). This state information can for example be stored in such a manner that it is associated with each cacheline in the L2 CACHE and L21 CACHE, or it could be stored in a manner such that it is associated with the location information in the corresponding CLT.

The coherence system will send coherence requests to the depicted cache subsystem in FIG. 9. These requests will first turn to CLB2 920 that may determine that this cache system does not have the requested cacheline (CLB2 miss or a CLB2 hit to an entry with an inactive C1P and the location information of the requested cacheline holding the value NOT VALID), it may contain the requested location information (CLB2 hit and the location information of the requested cacheline holding storing the location of the cacheline), or it may determine that CLB1 910 stores the associated location information (CLB2 hit and a valid C1P). In the latter case, a lookup in CLB1 910 is needed to determine either the location of the requested cacheline or that the cacheline does not reside in this cache sub-system (The corresponding location information in CLB1 contains NOT VALID pattern). Depending on the nature of the coherence request, for example an invalidate, a read request or an exclusive read request, the coherence protocol may perform some operations on the requested cacheline and possibly change its state. However, the exact functionality of that operation and the state changes required is orthogonal to these embodiments.

As a further illustrative example, and in order to describe the embodiments in a transactional/method manner rather than a structural manner, a number of such transactions are described below using the structural embodiment of FIG. 9, although the present invention is not limited thereto.

CLB1 Hit and L1 CACHE Hit:

1. CLB hit: One of the indexed CLEs in CLB1 has a VAT corresponding to the TAG portion of the VA.

2. L1 hit: The Location Information of named CLE that corresponds to the requested Cacheline identifies the L1 CACHE level as the location for the requested Cacheline.

3. L1 ACCESS: The L1 CACHE is accessed using the INDEX portion of the VA and WAY information from named Location Information.

4. Return data: The data read from the L1 CACHE is sent to the CPU

CLB1 Hit and L2 CACHE Hit:

1. CLB hit: One of the indexed CLEs in CLB1 has a VAT corresponding to the TAG portion of the VA.
2. L2 hit: The Location Information of named CLE that corresponds to the requested Cacheline identifies L2 CACHE level as the location for the requested Cacheline.
3. L1 ACCESS: The L1 CACHE is accessed using a VIRTUAL INDEX portion of the virtual address VA, the PI of named CLE and the WAY information from named Location Information.
4. Return data: The data read from the L2 CACHE is sent to the CPU
5. Data to L1 CACHE (optional):
   a. An appropriate location in L1 CACHE is identified (possible through an L1 eviction)
   b. Named Cacheline is move to this appropriate L1 CACHE location
   c. Named Location Information is changed to reflect this move.

CLB1 Hit and Cache Miss:
1. CLB hit: One of the indexed CLEs in CLB1 has a VAT corresponding to the TAG portion of the VA.
2. Cache miss: The Location Information of the matching CLE that corresponds to the requested Cacheline contains the Invalid Pattern.
3. Data read: The requested cacheline is read from the Memory (or higher level caches) and sent to the CPU, In this example PI has enough information for the Physical Address to be composed, In another example, part of the physical address produced by the TLB 950 may be used.
4. Data to L1 CACHE:
   a. An appropriate location in L1 CACHE is identified (possible through an L1 eviction),
   b. Named Cacheline is move to this appropriate L1 CACHE location
   c. Named Location Information is changed to reflect this move.

L1 Eviction, CLB1/CLB2 Update
1. L1 eviction: A Cacheline is selected to be evicted from the L1 CACHE
2. L2 CACHE update: A new appropriate location for it is identified in the L2 CACHE, possible causing a L2 CACHE eviction, and the Cacheline is moved to this location
3. CLB tracking: The C2P field of the selected Cacheline is used to find the corresponding CLB2 CLE entry. If its C1P is valid, it is used to find the corresponding entry in CLB1 and update it to reflect the Cacheline move. If its C1P is not valid, the corresponding CLB2 entry is updated to reflect this move.

The embodiments can also be applied on systems with several CPUs sharing a cache managed by the CLBs. In one embodiment, the CLB2 entry is extended with one C1P pointer corresponding to each of the CPUs sharing the cache.

Figure 10:
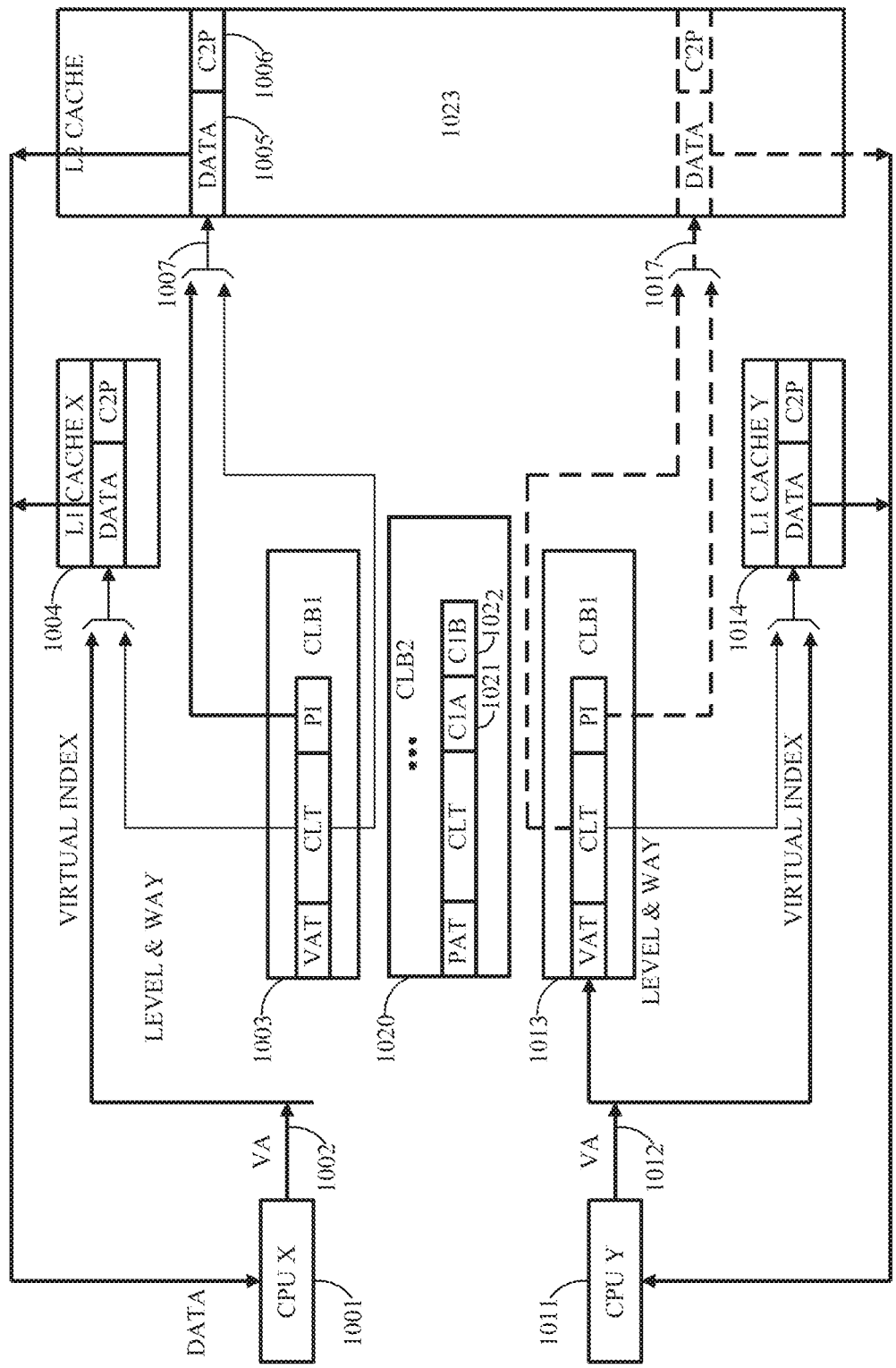
FIG. 10 is a block diagram illustrating an embodiment including two CPUs connected to a two-level cache hierarchy and a two-level CLB hierarchy.

For example, FIG. 10 shows a system built from two CPUs (1001 and 1011) each with their own CLB1 (1003 and 1013) and their own L1 CACHE (1004 and 1014) according to an embodiment. The system also contains a CLB2 1020, and an L2 CACHE 1023 which are shared between the two CPUs 1001, 1011. The CLB2 1020 has been extended to store two CLB1 entry pointers (CIA 1021 and CIB 1022), one for each CLB1 of respective CPU. If there is a valid CLB1 entry in any or both CLB1s, the pointer corresponding to the respective CLB1 will contain a valid pointer identifying the corresponding CLB1 entry.

In one embodiment, for CLB2 entries that have both CLB1 pointers valid, each corresponding CLB1's CTE is responsible for tracking the location of the corresponding cachelines in its L1 CACHE. In one embodiment, the number of CLB1 pointers associated with each CLB2 entry corresponds to the number of CLB1 s sharing that CLB2.

From the foregoing embodiments, various general features of the embodiments can be noted. These features can be used together in some embodiments, or in various sub-combinations in other embodiments. For example, a cache location buffer (CLB) is used to track the location of cache lines in a cache hierarchy. The cache hierarchy may include one or many caches of different sizes and access times. Each cache can store a plurality of cache lines stored in an associative way, for example divided into a number of sets, each containing a number of ways. While the address identifying a cache line can be used to identify a set within a cache where the cache line should reside, the identity of its way location cannot be determined by its address.

One task of the CLB according to some embodiments is to cheaply find the cache level and the location within that cache level which stores a specific cache line, or to cheaply determine that the cache line does not reside in the cache hierarchy at all. In this context, "cheaply" may refer to using less energy, operating more quickly, using less storage space, some combination thereof, or other beneficial results.

A CLB may be implemented according to some embodiments as an associative structure, storing a plurality of cache table entries (CTE). Each such entry stores, for example, an address tag and location information for the group of cache lines that are identified by that CTE. The CLB may be implemented in a hierarchical way with smaller and faster CLBs backed by larger but slower CLBs. The different CLB levels can be designed to be accessed using virtual or physical addresses.

The location of a requested cache line is determined by a lookup in the CLB, after which the cache line can be accessed at its determined level and location without the need for any other associative lookups. This removes the requirement to store additional address tags in the cache hierarchy.

Numerous variations and permutations of the above embodiments are contemplated. For example, in one embodiment the number of location information bits associated with a CTE may be different for different CLB levels and the copying of LI information between the CLB levels may be partial copying operations. In another embodiment, the functionality of a first-level CLB is integrated with the functionality of a TLB or contain parts of the functionality commonly found in TLBs. In an example of such an implementation, a CLB entry could contain some combination of virtual address tag (VAT), cache location table (CLT), access permission encodings and physical address translation, as well as other metadata commonly found in TLB implementations. Moreover, even though the examples above contain up to two cache levels and up to two CLB levels, those skilled in the art will understand that the techniques described herein can be generalized to apply to more levels of caches and more levels of CLB. There is no requirement that the number of cache levels and the number of CLB levels are the same. It will also be understood that the last level of CLB may spill and fill to a dedicated region in traditional (main) memory and that way act as a CLB cache.

In one embodiment, the information of a CTE may contain other metadata associated with its associated cachelines, including but not limited to, information about their access patterns and past usage, cacheline state, protection information normally stored in a TLB and the physical address portion needed to generate a physical address.

For clarity, most descriptions herein generally describe techniques for how a cacheline is located and returned to a requesting CPU. The descriptions do not describe in detail the various ways in which a requested word contained within the cacheline is selected and returned to the CPU, which will be apparent to those skilled in the art and would have unnecessarily obscured the invention.

For clarity, most descriptions herein describing the handling of data of cache hierarchies describe exclusive cache hierarchies. Those skilled in the art would understand that the described embodiments can be extended to also cover inclusive memory hierarchies and non-exclusive memory hierarchies.

Although the embodiments described above are useful in association with both uni-processor systems and multi-processor system, such as those illustrated and described above with respect to FIGS. 1 and 2 respectively, the CLB according to the foregoing embodiments is illustrated mostly in association with a uniprocessor system, but those skilled in the art will appreciate that the embodiments are thus not limited to such an implementation.

Although described above in the context of certain exemplary computer architectures, caching exists in many other settings within, as well as outside, a computer system and the foregoing embodiments are equally applicable to such other contexts. An example of such usages is the virtual memory system which caches data from a slow, high-capacity storage, such as a disk or FLASH memories, into a faster and smaller high-capacity memory that could be implemented using dynamic RAM. Other examples of caching in a computer system include, but are not limited to, disk caching, web caching and name caching. The organization and caching mechanisms of such caches may vary from those of the caches discussed above, e.g., variances in the size of a set, their implementation of sets and associativity, etc. Regardless of the implementation of the caching mechanism itself, the embodiments described herein are equally applicable for implementing the various caching schemes.

Figure 11:
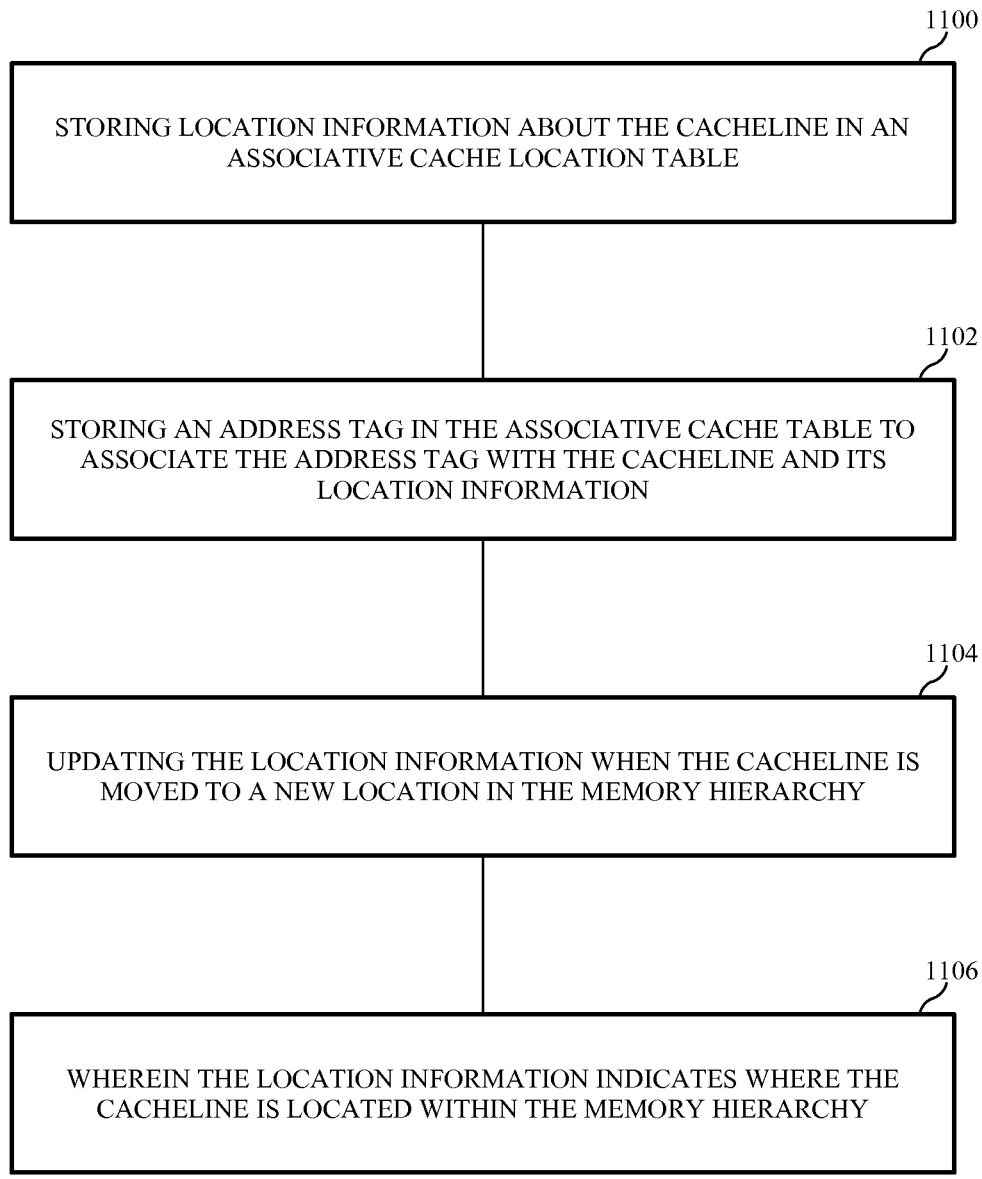
FIGS. 11 and 12 are flow diagrams associated with method embodiments.
Figure 12:
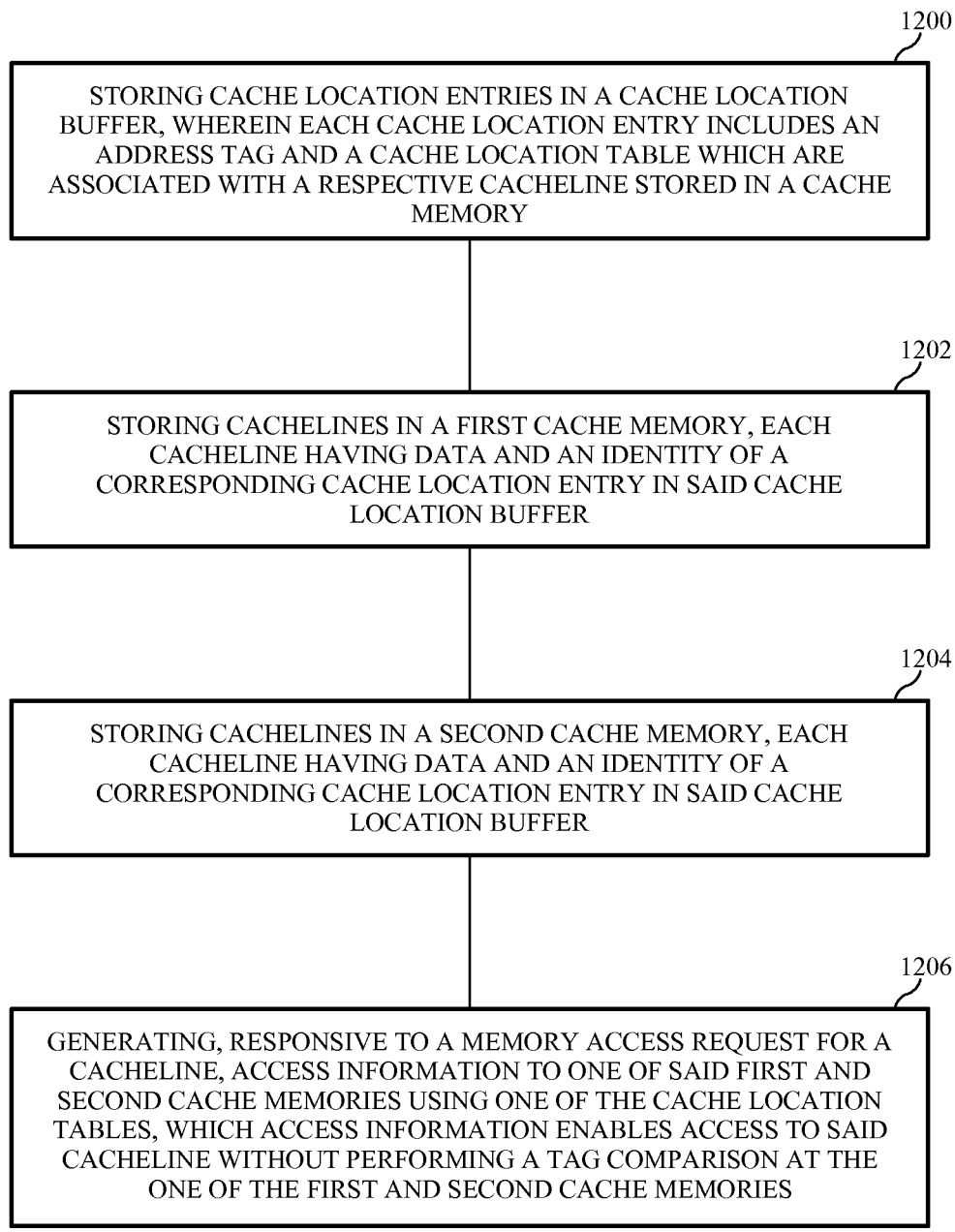

The embodiments can also be expressed as methods, examples of which are provided as FIGS. 11 and 12. In FIG. 11, a method of tracking the location of a cacheline in a memory hierarchy including one or more levels of cache memory includes various steps. At step 1100, cache location information about the cacheline is stored in a cache location table At step 1102, an address tag is stored in the cache table to associate the address tag with the cacheline and its location information. At step 1104, the cache location information is updated when the cacheline is moved to a new location in the memory hierarchy, wherein (block 1106) the cache location information indicates where the cacheline is located within the memory hierarchy.

In FIG. 12, a cache memory storage method includes various steps. At step 1200, cache location entries are stored in a cache location buffer, wherein each cache location entry includes an address tag and a cache location table which are associated with a respective cacheline stored in a cache memory. Cachelines are stored in a first cache memory at step 1202, each cacheline having data and an identity of a corresponding cache location entry in the cache location buffer. Cachelines are also stored in a second cache memory at step 1204, each cacheline having data and an identity of a corresponding cache location entry in the cache location buffer. At step 1206, and responsive to a memory access request for a cacheline, access information is generated to one of said first and second cache memories using one of the cache location tables, which access information enables access to the cacheline without performing a tag comparison at the one of the first and second cache memories.

The steps depicted in FIGS. 11 and 12 can be performed in various orders and some steps can be performed in parallel or sequentially. These method embodiments, the system embodiments described above, and other embodiments may provide various beneficial results. For example, Applicants have performed detailed simulation studies which have shown that cache implementations associated with the embodiments described herein can save substantial energy compared with conventional cache systems and can also result in caches with substantially shorter access time. For example, a system similar to the one depicted in FIG. 5*a* will consume 42% lower dynamic energy for an L1 read hit than the conventional cache implementation as depicted by FIG. 3 for an 8-way 32 kbyte cache. For a 16-way cache size of 64 kbyte, the corresponding saving is more than 50%. Using the banking technology brought forward in FIG. 7, the corresponding dynamic power savings are 53% for an 8-way 32 kbyte cache and 69% for a 16-way 64 kbyte cache. Furthermore, studies have shown that the L2 cache depicted in FIG. 5*a* would have about 40% shorter access time than the L2 cache depicted in FIG. 3 for a 16-way 1 Mbyte cache.

The disclosed embodiments describe, for example, systems and methods associated with various cache hierarchies. It should be understood that this description is not intended to limit the invention. On the contrary, the exemplary embodiments are intended to cover alternatives, modifications and equivalents, which are included in the spirit and scope of the invention. Further, in the detailed description of the exemplary embodiments, numerous specific details are set forth in order to provide a comprehensive understanding of the invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein. The methods or flow charts provided in the present application may be implemented in a computer program, software, or firmware tangibly embodied in a computer-readable storage medium for execution by a general purpose computer or a processor.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A cache system comprising:
 a location table hierarchy;
 a cache storage;
 wherein cachelines are stored in locations in the cache storage;
 wherein the location table hierarchy includes at least a first and a second location table,
 wherein the first and second location tables include a plurality of location table entries including an address tag field and a plurality of cache location information fields for the cachelines stored in the cache storage;

wherein the address tag fields of the first location table store virtual addresses and the address tag fields of the second location table store physical addresses;

wherein, in response to an access request for a cacheline to the cache system, a portion of a virtual address associated with the request is compared with address tag fields of the first location table to determine if a matching entry exists in the first location table;

wherein, if the matching entry exists in the first location table, one of the cache location information fields of the matching entry is utilized to identify a location of the cacheline requested by the access request;

wherein the requested cacheline is stored in the identified location; and wherein if no matching entry is found in the first location table, the virtual address of the access request is translated to a corresponding physical address and the second location table is searched for a matching entry, wherein, if the first location table contains an entry storing location information corresponding to a first cacheline in the cache storage, the second location table contains a second matching entry for the physical address of the first cacheline and the second matching entry stores information about an identity of the entry in the first location table storing the location information, wherein, if no matching entry is found in the first location table and if the matching entry in the second location table stores the identity of an entry in the first location table, it is determined that the entry in the first location table stores a synonym to the virtual address of the access request, wherein, if it is determined that an entry in the first location table stores a synonym to the virtual address of the access request, the synonym is forced out of the first location table and a new entry corresponding to the virtual address of the access request is created in the first location table, and wherein the new entry of the first location table will inherit location information from the forced-out synonym entry.

2. The cache system of claim 1, wherein the one of the cache location information fields can indicate that the requested cacheline is not in the cache storage.

3. The cache system of claim 1, wherein all cache storage locations identified by a second location table entry, or its associated entry in a first location table, are evicted when the second location table entry is evicted from the second location table.

4. The cache system of claim 1, wherein in response to a coherence request from a coherence protocol, the second location table is searched for a matching entry, and, if a match in the second location table is determined, a location for a cacheline associated with the coherence request is determined by location information stored in the matching entry or its associated entry stored in a first location table.

5. The cache system of claim 1, wherein the cache storage includes a plurality of cache memories and location information of the matching entry identifies a cache memory where requested data resides.

6. The cache system of claim 5, wherein the location information of the matching entry also is utilized to identify a location within the identified cache memory where the requested cacheline resides.

7. The cache system of claim 1, wherein locations in the cache storage storing cachelines also store information about an identity of a corresponding entry in the second location table.

8. A cache system comprising:
a location table;
a cache storage; and
an associative backwards look-aside (BLT) structure,
wherein cachelines are stored in locations in the cache storage,
wherein the location table includes a plurality of location table entries arranged in a plurality of sets such that each location table entry is included in a set from among the plurality of sets and each set includes at least two location table entries from among the plurality of location table entries,
wherein each location table entry from among the plurality of location table entries includes a virtual address tag field and a plurality of cache location information fields,
wherein, the location table is configured such that, in response to receiving an access request at the cache system, the location table outputs a first location from one of the plurality of cache location information fields included in a selected location table entry from among the plurality of location table entries,
wherein a virtual address associated with the access request includes a tag value and an index value, the index value corresponds to a first set from among the plurality of sets, and the selected location table entry is a table entry, from among the at least two location table entries included in the first set, that has a virtual address field that matches the tag value included in the virtual address,
wherein the first location is a location in the cache storage of a cacheline requested by the access request,
wherein the requested cacheline is stored in the first location in the cache storage,
wherein the BLT structure is equipped with physical address tags coupled to identity information about location table entries, and is configured to identify an entry in the location table associated with a specific physical address,
wherein the BLT structure is searched using a physical address for a new entry being installed in the location table, and
wherein the BLT structure and the location table are configured such that, in response to the search of the BLT structure identifying an entry as a match for the search using the physical address,
it is determined that the entry identified by the BLT structure is a synonym entry corresponding to the new entry,
cache location information of the synonym entry is copied to the new entry, and
the synonym entry is removed from the location table.

9. The cache system of claim 8, wherein the one of the cache location information fields can indicate that the cacheline requested by the access request is not in the cache storage.

10. The cache system of claim 8, wherein the location table stores only one location table entry corresponding to synonyms of a specific physical address.

11. The cache system of claim 8, wherein the cache storage includes a plurality of cache memories wherein the requested cacheline can be stored in any of the plurality of cache memories and location information of a matching entry can identify in which of the plurality of cache memories requested data resides.

12. The cache system of claim 11, wherein location information of the matching entry also is utilized to identify a location within the identified cache memory where the requested cacheline resides.

13. The cache system of claim 8, wherein locations in the cache storage storing cachelines also store information used to identify a matching entry in the location table that stores its location information.

14. The cache system of claim 13, wherein the information used to identify the matching entry is used to find and update location information corresponding to the cacheline stored in the first location when the cacheline is evicted.

15. The cache system of claim 8, wherein all cache storage locations identified by a location table entry are evicted when the entry is evicted from the location table.

* * * * *